(12) United States Patent
Varon et al.

(10) Patent No.: US 11,230,456 B2
(45) Date of Patent: Jan. 25, 2022

(54) ELEVATOR EMERGENCY BRAKE WITH SHOES

(71) Applicant: G.A.L. Manufacturing Company, LLC, Bronx, NY (US)

(72) Inventors: James Varon, Bronx, NY (US); John Curzon, Fareham (GB); Thomas Wei, Guangxi (CN)

(73) Assignee: G.A.L. Manufacturing Company, LLC, Bronx, NY (US)

( * ) Notice: Subject to any disclaimer, the term of this patent is extended or adjusted under 35 U.S.C. 154(b) by 519 days.

(21) Appl. No.: 16/085,885

(22) PCT Filed: May 7, 2018

(86) PCT No.: PCT/CN2018/085843
§ 371 (c)(1),
(2) Date: Sep. 17, 2018

(87) PCT Pub. No.: WO2019/213803
PCT Pub. Date: Nov. 14, 2019

(65) Prior Publication Data
US 2020/0122969 A1   Apr. 23, 2020

(51) Int. Cl.
*B66B 5/02* (2006.01)
*F16H 25/20* (2006.01)

(52) U.S. Cl.
CPC ............. *B66B 5/02* (2013.01); *F16H 25/20* (2013.01); *B66B 5/025* (2013.01); *F16H 2025/2071* (2013.01); *F16H 2025/2081* (2013.01)

(58) Field of Classification Search
CPC . B66B 5/02; B66B 5/025; F16H 25/20; F16H 2025/2071; F16H 2025/2081
See application file for complete search history.

(56) References Cited

U.S. PATENT DOCUMENTS

| 2,512,315 | A | * | 6/1950 | Eames | B66B 5/025 |
| | | | | | 187/277 |
| 5,101,937 | A | * | 4/1992 | Burrell | B66B 5/185 |
| | | | | | 187/350 |

(Continued)

FOREIGN PATENT DOCUMENTS

| CN | 1084482 A | 3/1994 |
| CN | 2732700 Y | 10/2005 |

(Continued)

OTHER PUBLICATIONS

Chinese Search Report for Application No. 201880001702.8 dated Sep. 27, 2020, 2 pages.

(Continued)

*Primary Examiner* — Michael A Riegelman
(74) *Attorney, Agent, or Firm* — Lerner, David, Littenberg, Krumholz & Mentlik, LLP

(57) ABSTRACT

In one embodiment, a braking apparatus includes a pair of brake shoes, a cam follower connected to at least one of the shoes, a compressible spring connected to the cam follower, and an actuation assembly including a motor, a ball screw and an electromagnetic clutch. The braking apparatus is operative to transition from a brake applied position where the brake shoes are closed and a brake release position where the brake shoes are separated. When the braking apparatus is in the brake release position, a brake application may be commenced to close the shoes by power no longer being supplied to the electromagnetic clutch. Additionally, when the braking apparatus is undergoing a brake release cycle to separate the brake shoes, the brake application cycle may also be commenced prior to completion of the brake release cycle when power is no longer supplied to the electromagnetic clutch and the motor.

13 Claims, 15 Drawing Sheets

(56) References Cited

U.S. PATENT DOCUMENTS

| | | | | |
|---|---|---|---|---|
| 5,228,540 | A | * | 7/1993 | Glaser ................... B66B 5/04 |
| | | | | 187/355 |
| 8,256,579 | B2 | * | 9/2012 | Jia ........................ B66B 5/185 |
| | | | | 187/350 |
| 8,511,437 | B2 | | 8/2013 | Glaser |
| 8,631,909 | B2 | * | 1/2014 | Draper ................... B66B 5/06 |
| | | | | 187/373 |
| 8,973,717 | B2 | * | 3/2015 | Bae ...................... B66C 15/02 |
| | | | | 188/65.1 |
| 2006/0118366 | A1 | * | 6/2006 | Eckenstein ............ B66B 5/185 |
| | | | | 188/65.1 |
| 2007/0007083 | A1 | * | 1/2007 | Husmann ............... B66B 5/18 |
| | | | | 187/366 |
| 2009/0294220 | A1 | * | 12/2009 | Glaser ................... B66B 5/185 |
| | | | | 187/350 |
| 2016/0108998 | A1 | * | 4/2016 | Sprocq ................... F16H 25/20 |
| | | | | 74/89.23 |
| 2017/0217728 | A1 | * | 8/2017 | Zou ........................ B66B 5/24 |
| 2020/0122969 | A1 | * | 4/2020 | Varon .................... F16H 25/20 |

FOREIGN PATENT DOCUMENTS

| | | | |
|---|---|---|---|
| CN | 2732701 | Y | 10/2005 |
| CN | 2732711 | Y | 10/2005 |
| CN | 1789102 | A | 6/2006 |
| CN | 100542942 | C | 9/2009 |
| CN | 201325807 | Y | 10/2009 |
| CN | 201525729 | U | 7/2010 |
| CN | 201651131 | U | 11/2010 |
| CN | 201694702 | U | 1/2011 |
| CN | 201694708 | U | 1/2011 |
| CN | 101575062 | B | 5/2011 |
| CN | 101798036 | B | 1/2012 |
| CN | 202744133 | U | 2/2013 |
| CN | 103434912 | A | 12/2013 |
| CN | 103523633 | A | 1/2014 |
| CN | 103601055 | A | 2/2014 |
| CN | 203461759 | U | 3/2014 |
| CN | 203486698 | U | 3/2014 |
| CN | 203568625 | U | 4/2014 |
| CN | 203568626 | U | 4/2014 |
| CN | 203568627 | U | 4/2014 |
| CN | 103964275 | A | 8/2014 |
| CN | 204124976 | U | 1/2015 |
| CN | 204125105 | U | 1/2015 |
| CN | 104326326 | A | 2/2015 |
| CN | 204138078 | U | 2/2015 |
| CN | 104528574 | A | 4/2015 |
| CN | 104555789 | A | 4/2015 |
| CN | 204251118 | U | 4/2015 |
| CN | 204310760 | U | 5/2015 |
| CN | 204310761 | U | 5/2015 |
| CN | 204342346 | U | 5/2015 |
| CN | 102659006 | B | 6/2015 |
| CN | 103224178 | B | 6/2015 |
| CN | 103601054 | B | 7/2015 |
| CN | 103466495 | B | 10/2015 |
| CN | 105035907 | A | 11/2015 |
| CN | 204847663 | U | 12/2015 |
| CN | 204873335 | U | 12/2015 |
| CN | 103112794 | B | 3/2016 |
| CN | 206553009 | U | 10/2017 |
| DE | 102012013211 | A1 | 2/2013 |

OTHER PUBLICATIONS

International Search Report for PCT/CN2018/085843, dated Feb. 11, 2019, 6 pages.

* cited by examiner

ELEVATOR EMERGENCY BRAKE WITH SHOES

BACKGROUND ART

Elevator cars and other vehicles and devices, such as hooks, buckets and material harnesses on cranes or launching apparatuses, are movable in two opposite directions, frequently by means of a cable or wire rope.

Generally speaking, elevator cars movable by hoist ropes are suspended by wire ropes which go over a traction sheave and down to a counterweight. The counterweight serves to reduce the power required to move the elevator, and also to create traction (prevent slippage) with respect to the traction sheave. The traction sheave is driven directly by a motor or indirectly by a motor through a geared machine. A normal brake is applied to the drive to stop and/or hold the elevator at a floor along the elevator shaft.

With elevator cars, specifically, the usual elevator codes require that an emergency brake be included, such brake arresting the descent of the elevator car when it is descending at a speed in excess of a predetermined speed. A known braking device for such purpose is a safety device which grips the car guide rails even in the event of breakage of the elevator hoisting rope.

With a high factor of safety for the wire ropes, at least one country has recognized that these ropes never break and is allowing other emergency brakes in lieu of the safety device which grips the guide rails. Also, since counterweights are generally heavier than the elevator, with a mechanical failure, such as that of the normal brake, there is danger of the elevator over speeding in the ascending direction. In addition, depending on the load in the elevator car when a mechanical failure occurs, the car could leave the floor in either direction with the doors open. Many countries require emergency devices to be activated in the event of the above, and also require ascending car overspeed protection. In addition, many countries are considering code changes to require protection against leaving the floor with the doors opened.

Known braking devices include brakes applied to the hoisting drum (traction sheave), to the hoisting ropes, or to the car or counterweight guide rails.

It is considered to be important that the braking force be substantially constant even with wear of various elements of the braking system, such as wear of the brake shoe linings. Additionally, the brake should be responsive to overspeed in either direction or to improper opening of doors during use. Thus, it would be advantageous to include as part of an elevator system an emergency brake capable of gripping the ropes to satisfy the above requirements. Even with such an emergency brake, however, the brake would need to be reset after it has been applied, and resetting of the brake may require at least several seconds to reach a fully open state during which the brake cannot be applied.

Thus, a need exists for an improved emergency elevator braking apparatus that can stop an elevator with a smooth and consistent braking force, even when the brake pads are worn, and also apply a braking force while resetting the brake.

SUMMARY

In one aspect, the present disclosure relates to a braking apparatus. In one embodiment, the braking apparatus includes a pair of brake shoes, a cam follower, a compressible spring and an actuation assembly. The pair of brake shoes have facing surfaces, wherein at least one of the shoes is mounted for movement of its face toward the face of the other of the shoes. The cam follower is connected to the at least one of the shoes for moving the face of the at least one of the shoes relative to the face of the other of the shoes. The compressible spring is connected to the cam follower for actuating the cam follower and thereby causing the face of the at least one of the shoes to move relative to the face of the other of the shoes. The actuation assembly is connected to the cam follower and acts through the cam follower for compressing the compressible spring.

Under a supply of power to the actuation assembly, the actuation assembly is operable to control a force acting on the cam follower and the at least one of the brake shoes from a start of a brake release cycle to and at an end of the brake release cycle. At the start, the apparatus is in the brake applied position and at the end, it is in the brake release position. The brake applied position being is defined by the apparatus having one of the shoes applying a force to the other of the shoes and the brake release position is defined by the faces of the shoes having a distance therebetween.

Without the supply of power to the actuation assembly, the actuation assembly applies less force on the cam follower and the at least one of the brake shoes than an opposing force in the compressible spring. Further, when power is no longer supplied to the actuation assembly during the brake release cycle in the brake release position, the brake shoes move from the brake release position at a start of a brake application cycle to an end of the brake application cycle at which the brake applied position of the apparatus is obtained. Moreover, when power is no longer supplied to the actuation assembly during the brake release cycle, the brake shoes return to the brake applied position.

The actuation assembly includes an electromagnetic clutch for holding the compressible spring in its compressed state upon completion of the brake release cycle to maintain the brake release position and for releasing the compressible spring from the compressed state when the electromagnetic clutch disengages from the cam follower at the start of the brake application cycle. Upon release of the compressible spring from the compressed state at the start of the brake application cycle, the compressible spring actuates the cam follower and moves the face of the at least one of the shoes toward the face of the other of the shoes to obtain the brake applied position, wherein the brake applied position is obtained within a predetermined time from the release.

In some embodiments, the actuation assembly includes a ball screw assembly with a screw and a nut moveable relative to the screw, the ball screw assembly configured to (1) convert a rotational motion of the screw in a first direction into a downward linear motion in the nut during the brake release cycle and (2) convert an upward linear motion in the nut into a rotational motion of the screw in a second direction during the brake application cycle, the first direction being opposite the second direction. In other embodiments, the actuation assembly also includes a carriage with a slot therein, the carriage fixed to the nut of the ball screw assembly and the cam follower disposed in the slot such that the cam follower is closer to a first end of the slot in the brake applied position and closer to a second end of the slot in the brake release position, the first end being opposite the second end. In other embodiments, the apparatus also includes a cam surface with a surface shaped so that the cam follower gradually moves from or near the first end of the slot in the carriage to or near the second end of the slot in the carriage during the brake release cycle.

In some embodiments, the power is supplied to a motor of the actuation assembly such that the motor is powered on during the brake release cycle and is powered off during the brake application cycle, the motor causing the screw to rotate in the first direction during the brake release cycle. In other embodiments, the apparatus includes a switch and an actuation mechanism coupled to the power supply, the actuation mechanism having a first position and a second position. The actuation mechanism moves from the first position to the second position when the apparatus moves into the brake release position. In the first position power is supplied to the motor while in the second position no power is supplied to the motor. In another embodiment, the actuation assembly includes an engagement gear (1) engaged with the electromagnetic clutch when the electromagnetic clutch is supplied with power and (2) engaged with the screw and transferring torque from the motor to the screw when the motor is supplied with power. In yet another embodiment, the actuation assembly includes a one-way bearing fixed to the electromagnetic clutch, the one-way bearing providing an engaged connection between the electromagnetic clutch and the screw when the screw rotates in the first direction and disengaged from the screw when the screw rotates in the second direction.

In some embodiments, the apparatus includes a controller and a button connected to the controller, the controller operable to control supply of power from the power supply in response to actuation of the button. The supply of power by actuation of the button initiates the brake release cycle when the actuation occurs while the apparatus is in the brake applied position. In other embodiments, the apparatus includes a timer connected to the button and the controller. The timer is operative in response to the actuation of the button such that the timer counts while the button is maintained actuated so that when a time counted reaches a predetermined amount, a signal is generated to cause the supply of power to be transmitted from the power supply to the actuation assembly.

In another aspect, the present disclosure relates to a method of resetting and braking. In one embodiment, the method is performed with an apparatus that includes an actuation assembly, a cam follower, a compressible spring and a pair of brake shoes. The apparatus is initially in a brake applied position and a predetermined force is applied from one of the pair of brake shoes onto the other of the pair of brake shoes. From this initial position, the method involves: supplying the actuation assembly with power; driving a ball screw assembly of the actuation assembly, and, acting through a cam follower connected to the ball screw assembly, applying a force to compress the compressible spring, wherein the actuation assembly controls a force of the ball screw assembly continuously acting on the cam follower and at least one brake shoe of the pair of brake shoes from a start of a brake release cycle to and at an end of the brake release cycle at which a brake release position of the pair of brake shoes is obtained, the brake release cycle starting when a position of the pair of brake shoes moves from a brake applied position; and moving the face of the at least one of the shoes away from the face of the other of the shoes, based on the compressing of the compression spring.

Continuing to refer to the above method embodiment, the cam follower is connected to at least one brake shoe of the pair of brake shoes having facing surfaces and the at least one of the shoes is mounted for movement of its face toward and away from the face of the other of the shoes. When power to the actuation assembly is maintained throughout the brake release cycle, the brake release cycle continues to completion such that the brake release position is obtained. When power is no longer supplied to the actuation assembly during the brake release cycle, the brake application cycle commences with the compressible spring decompressing to return the apparatus to the brake applied position.

In some embodiments, when power is no longer supplied to the actuation assembly during the brake release cycle, the ball screw assembly applies less force to the cam follower than an opposing force in the compressible spring. In other embodiments, when power is no longer supplied to the actuation assembly during the brake release cycle, decompressing the spring actuates the cam follower and causes the face of the at least one of the shoes to move toward the face of the other of the shoes to obtain the brake applied position for the brake shoes, wherein the brake applied position is obtained within a predetermined time from the release. In still further embodiments, the predetermined time ranges from 0.1 to 0.2 seconds.

In some embodiments, the method also includes powering off a motor of the actuation assembly in conjunction with the completion of the brake release cycle while maintaining the supply of power to an electromagnetic clutch of the actuation assembly, the magnetic clutch remaining fixed to the ball screw assembly and holding the spring in a compressed state such that the apparatus is maintained in the brake release position. Upon releasing the spring from the compressed state at the start of the brake application cycle, decompressing the spring to actuate the cam follower and cause the face of the at least one of the shoes to move toward the face of the other of the shoes to obtain the brake applied position for the brake shoes, wherein the brake applied position is obtained within a predetermined time from the release.

BRIEF DESCRIPTION OF THE DRAWINGS

Other objects and advantages of the present disclosure will be apparent from the following detailed description of the present preferred embodiments, which description should be considered in conjunction with the accompanying drawings in which like reference indicate similar elements and in which.

DETAILED DESCRIPTION OF THE EMBODIMENTS

Although the disclosure is described below in connection with a braking apparatus for applying a braking force to hoisting ropes of an elevator car, it will be apparent to those skilled in the art that the braking apparatus may have other applications, for example, to guide rails, or to other translatable equipment, such as a traction sheave, a combination of a traction sheave and ropes, a deflector sheave, a combination of a deflector sheave and ropes, or compensation ropes of an elevator car, etc.

Figure 1:
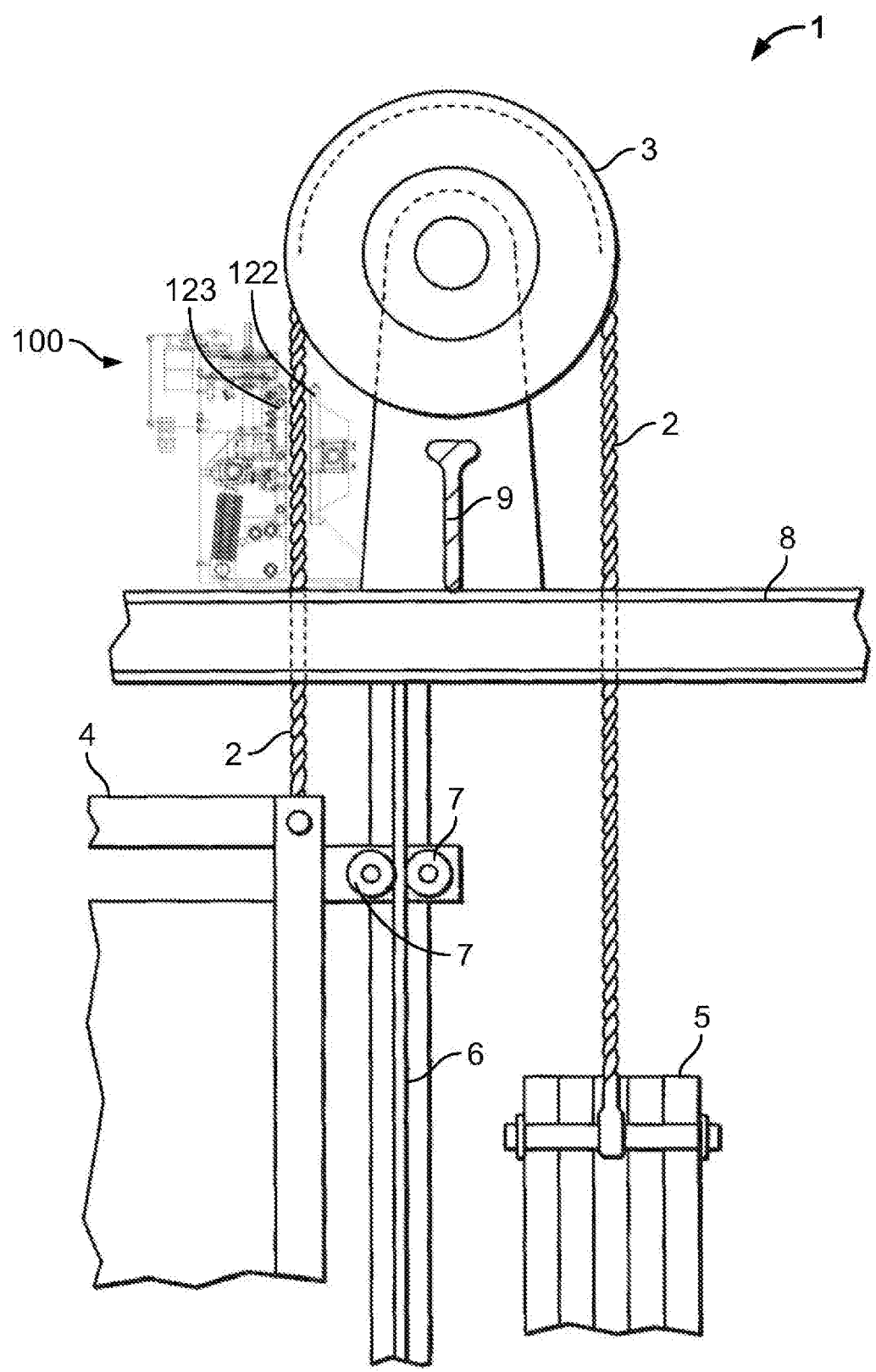
FIG. 1 is a side elevation view of an elevator emergency braking apparatus according to one embodiment of the disclosure.

FIG. 1 illustrates schematically, in side elevation, an elevator system 1 comprising an exemplary braking apparatus 100, in accordance with aspects of the present disclosure, associated with hoisting ropes 2 which pass over a motor driven traction sheave 3. The ropes 2 suspend and hoist an elevator car 4 at one side of the sheave 3 and, at the opposite side of the sheave 3, are attached to a counterweight 5. The car 4 is guided at opposite sides by guide rails and rollers, only one combination of which, rail 6 and rollers 7, is shown. The sheave 3 and its supporting apparatus are supported by fixed beams 8 and 9, and the braking apparatus 100 is supported by the beam 8, although it may be otherwise located on a fixed support.

Except for the braking apparatus 100, the equipment described in the preceding paragraph is conventional. The braking apparatus is in a fixed position and engages the ropes 2 at the side of the sheave 3 at which the rope or ropes 2 extend to the car 4, or may engage the rope or ropes at the side of the sheave 3 which extend to the counterweight 5. Also, the shoes (hereinafter described) of the braking apparatus 100 may be applied to braking of the sheave 3 in the same manner as the conventional sheave braking apparatus (not shown), or may be carried by the car 4 and applied to the guide rail 6, or if two of the braking apparatuses 100 are carried by the car 4, to the guide rail 6 and the opposite, corresponding guide rail (not shown). In all cases, relative movement between the braking apparatus and another member is arrested when the braking apparatus is actuated.

Figure 2:
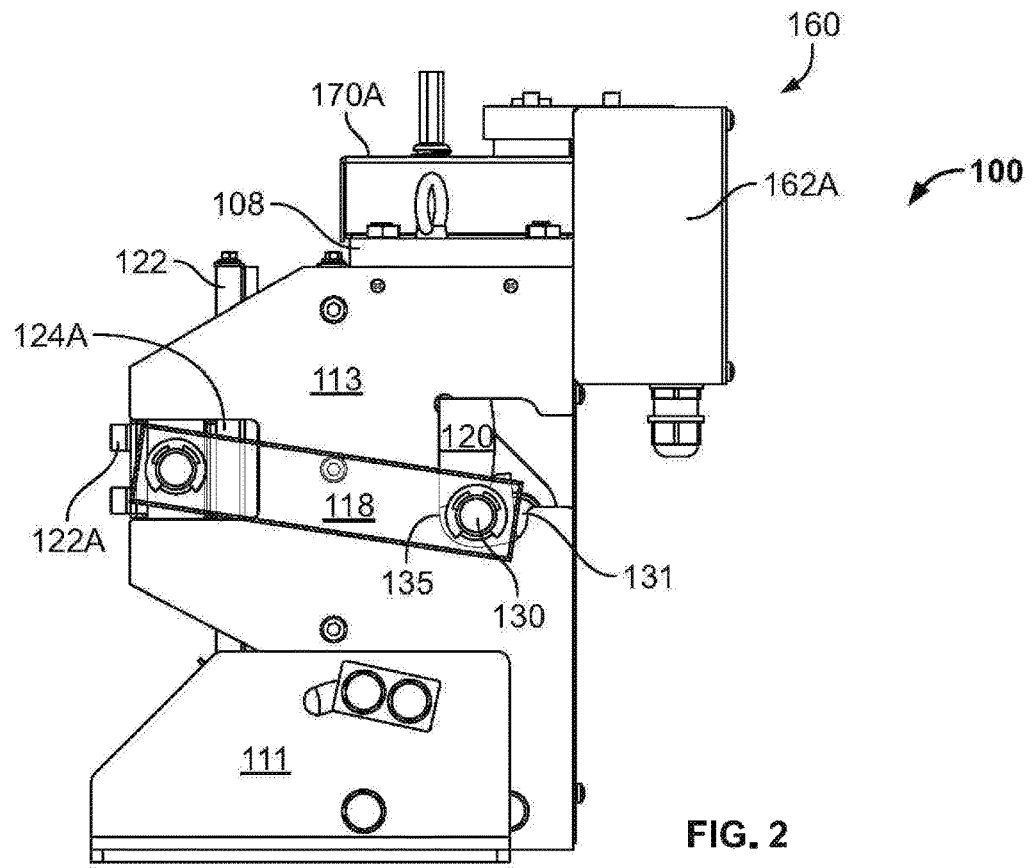
FIGS. 2-3 are side views of the elevator emergency braking apparatus shown in FIG. 1 on a first side and a second side opposite the first side, respectively.
Figure 3:
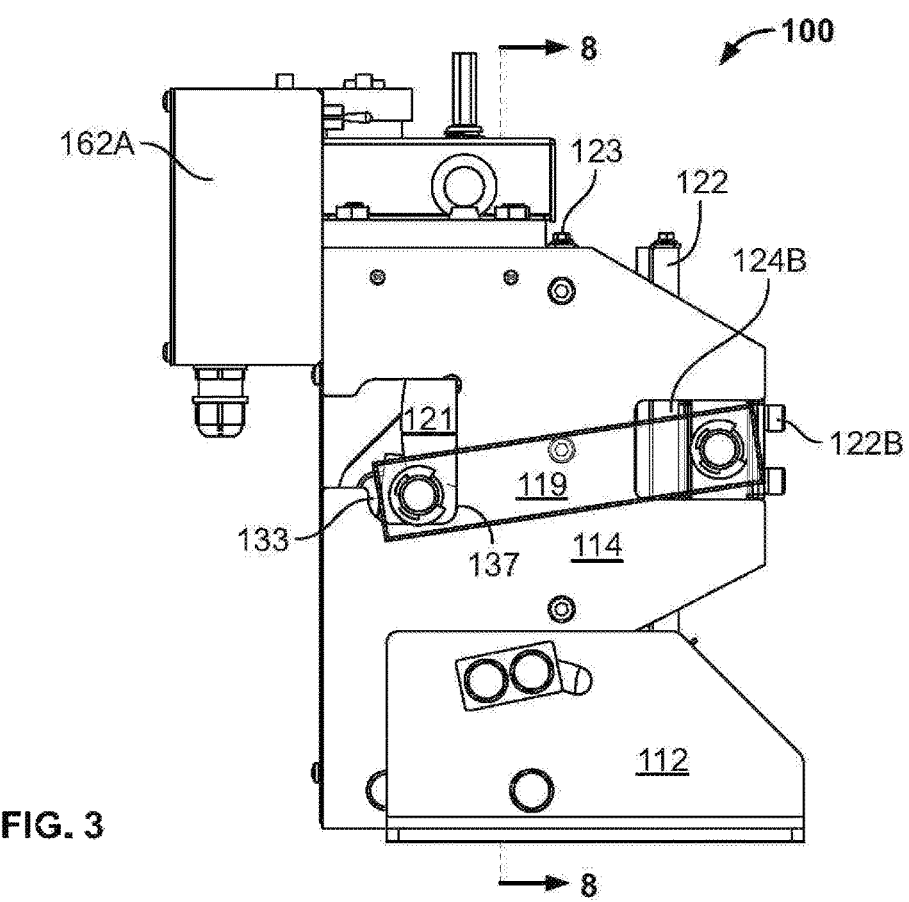
Figure 4:
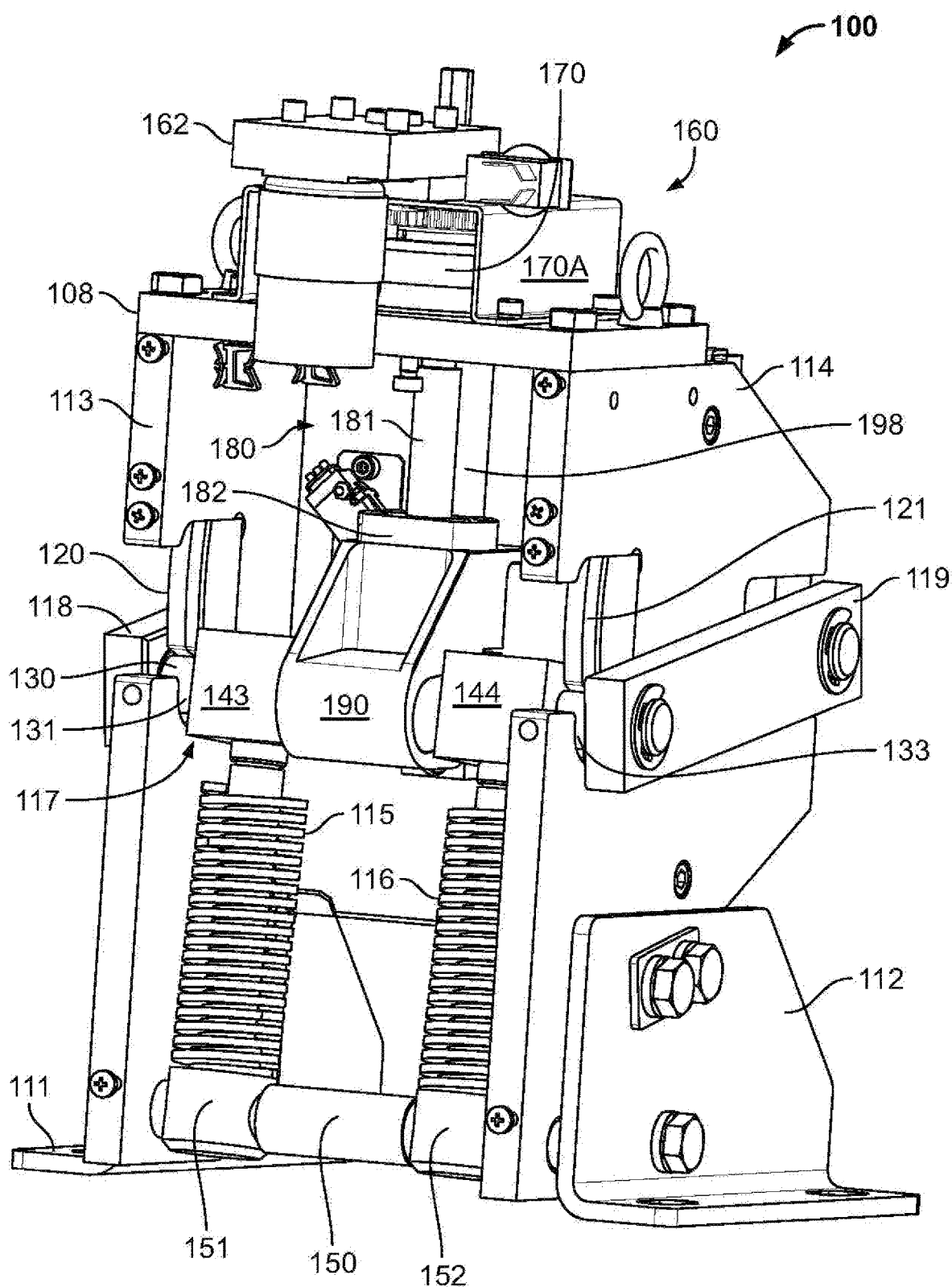
FIG. 4 is a perspective view of the elevator emergency braking apparatus shown in FIG. 1 with some elements hidden for clarity.

The exemplary braking apparatus 100 is now described in greater detail with reference to FIGS. 2-9. Referring to FIGS. 2 and 3, the braking apparatus 100 includes a pair of side plates 113 and 114 securable to the beam 8 or other surface by a pair of metal angle members 111 and 112. The side plates 113, 114, along with upper plate 108, are sized and oriented to form a partially enclosed space for the placement of several components of the apparatus 100. Referring to FIG. 4, between the side plates 113 and 114, there are a pair of resilient members 115 and 116, such as compressible springs, which apply pressure to a cam means. The cam means comprises a cam follower 117. The cam follower 117 is slidably carried by a pair of connecting arms 118 and 119. With continued reference to FIG. 4, the cam follower 117 includes an inner shaft 130 and outer portions in the form of caps 143, 144. The shaft 130 engages a pair of cam surfaces 120 and 121 which are attached to or are a part of the side plates 113 and 114, respectively. It should be noted that, for purposes of clarity, certain elements of the apparatus 100 are hidden in FIGS. 4 and 5.

Referring to FIGS. 2-4, the side plates 113 and 114 define slots 131, 133 with ends 135, 137, respectively. The slots 131, 133 are sized slightly larger than the outer diameter of the inner shaft 130, so as to allow movement of the shaft 130 within the slots 131, 133 toward and away from the ends 135, 137. When the shaft 130 is within the slots 131, 133, the shaft 130 is in contact with cam surface portions 120 and 121. In one embodiment, the slots 131, 133 and the cam surface portions 120, 121 are of sufficient length to provide that, when the apparatus 100 is in a brake release position, described in greater detail below, the brake shoes 122, 123 are sufficiently spaced from each other such that the linings 125, 126 do not contact the ropes 2, even if the ropes 2 are not linearly aligned with one another.

Figure 5:
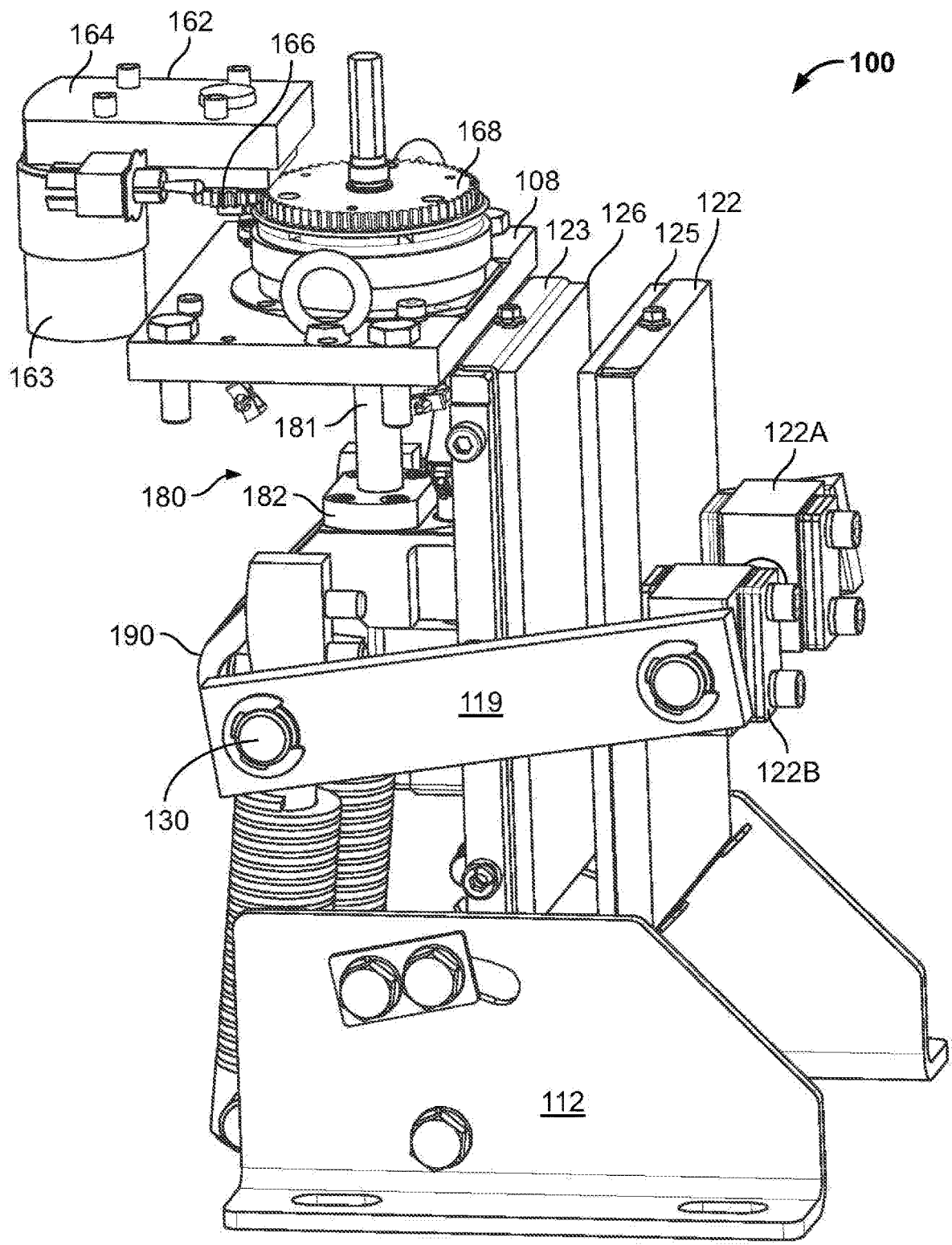
FIG. 5 is another perspective view of the elevator emergency braking apparatus shown in FIG. 1 with some elements hidden for clarity.

Referring to FIGS. 2, 3 and 5, the ends of the connecting arms 118 and 119 opposite the cam follower 117 are pivotally connected to blocks 122A and 122B affixed to a movable brake shoe 122. The blocks 122A, 122B are partially contained in recesses 124A, 124B formed in the side plates 113, 114, respectively, and are slidable within the recesses 124A, 124B. The shoe 122, based on movement of the blocks 122A, 122B within the recesses 124A, 124B, is urged away from and towards a fixed brake shoe 123. The shoe 123 is secured between the side plates 113 and 114 in any conventional manner. In some examples, the connecting arms 118, 119 and/or one or both of the brake shoes 122, 123 are made of a metal material. The shoes 122 and 123 have conventional brake linings 125 and 126, respectively (FIG. 5), which can, for example, be a rigid, molded, asbestos free lining of the type sold by Raymark Industrial Division, 123 East Stiegel St., Mankum, Pa. 17545 under the type No. M-9723. As shown in FIG. 5, each of the brake linings 125, 126 includes a surface face that faces a corresponding surface face on the other of the linings 125, 126.

It will be apparent that when the shoe 122 is moved toward the shoe 123 by a sufficient distance, the linings 125 and 126 will engage the ropes 2. In addition, when sufficient pressure is applied to the ropes 2 by the linings 125 and 126, movement of the ropes 2 relative to the shoes 122 and 123 will be arrested. The apparatus 100 of the disclosure can develop such pressure with the springs 115 and 116, which exert a decreasing force as the cam follower 117 moves upwardly. The pressure applied to the ropes 2 can be a multiple of the forces provided by the springs 115, 116. In addition, such applied pressure can be held constant, as discussed below. Also, although two springs 115 and 116 are illustrated, a single spring or more than two springs may be used for exerting a force on the cam follower 117.

Figures 14A, 14B:
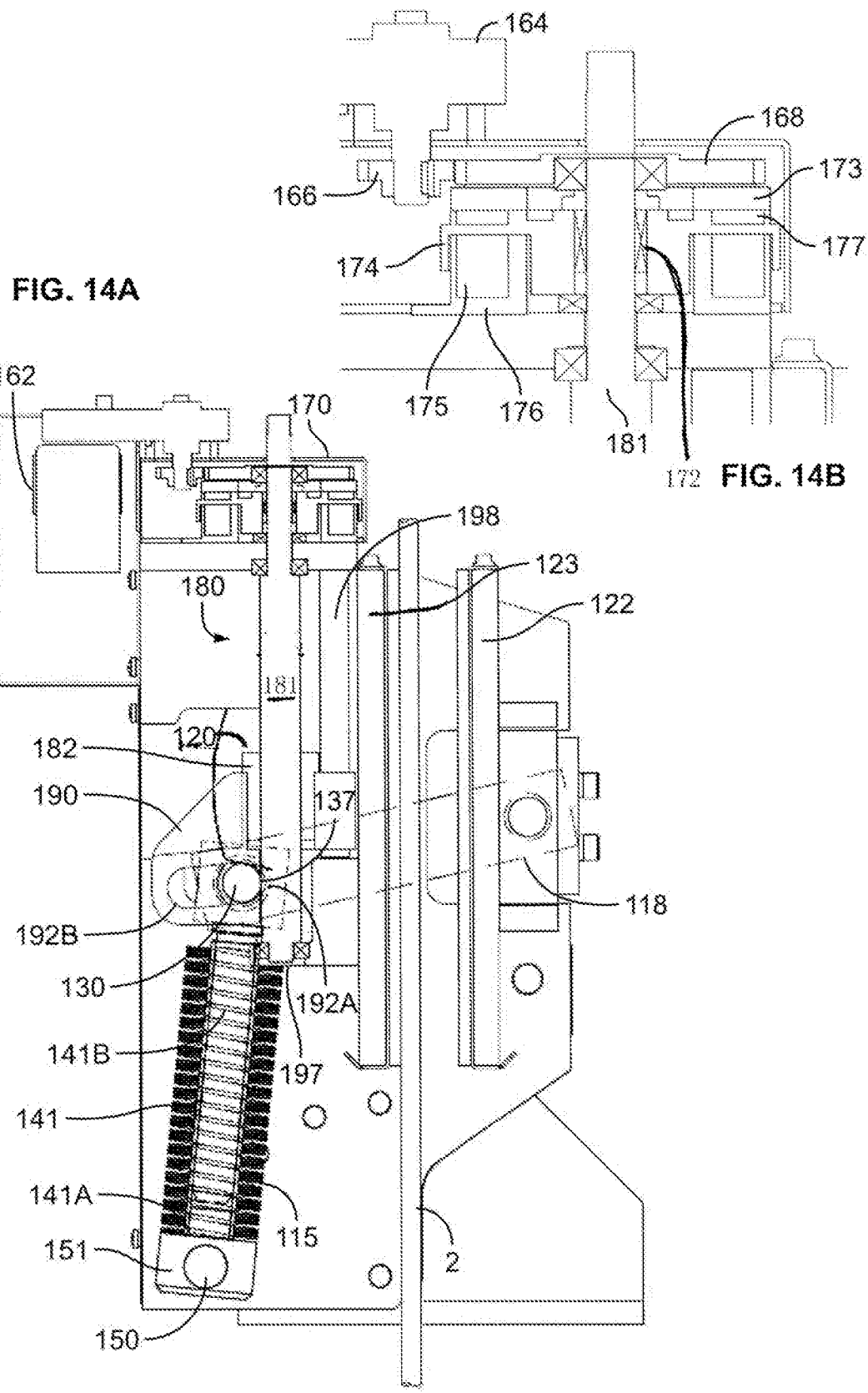
FIGS. 14A-14B are cross-sectional and close-up partial views, respectively, of an exemplary elevator emergency braking apparatus in a brake release position according to one method of operating the elevator emergency braking apparatus.
Figure 15B:
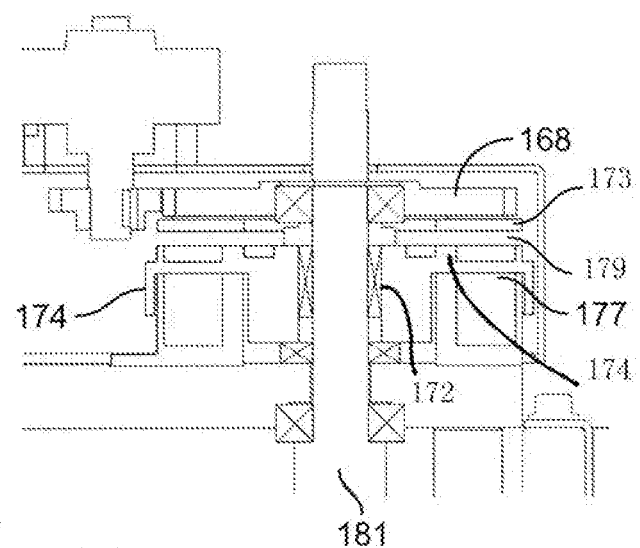
FIGS. 15A-15B are cross-sectional and close-up partial views, respectively, of an elevator emergency braking apparatus in a brake applied position according to a method of operating the elevator emergency braking apparatus.
Figure 15A:
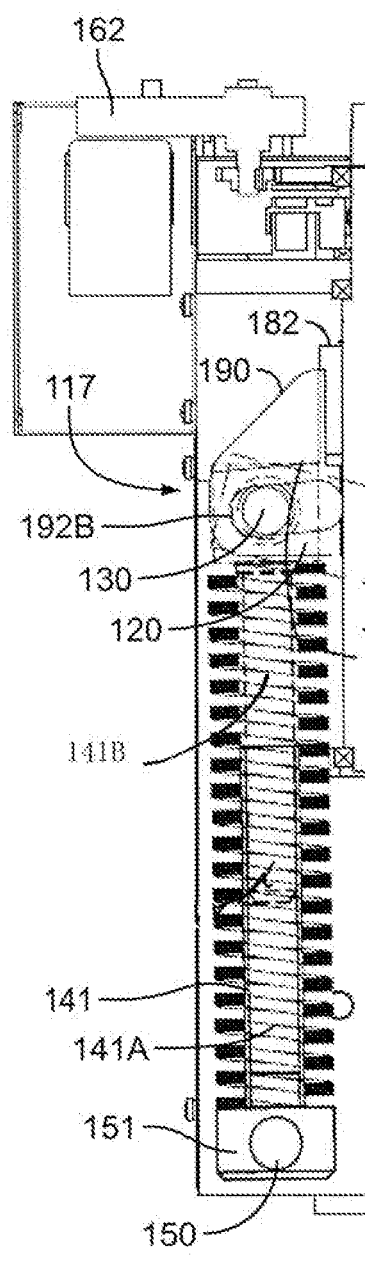

Referring to FIGS. 4-5, 14A, 15A and 16-17, the springs 115 and 116 are mounted on guides 141 which are pivotally mounted to lower transverse shaft 150 via spring supports 151 and 152, respectively, at their lower ends. As shown in FIGS. 14A and 15A, for example, each of the guides 141 includes a tube 141A held in a position which is fixed relative to its axis and a rod 141B which slidably telescopes within the tube 141A. The upper end of the rod 141B is secured to the inner shaft 130. The upper ends of the springs 115 and 116 are secured to caps 143 and 144 respectively, which are shaped to engage and hold against the inner shaft 130, as shown in FIG. 4, and provide secure engagement between the springs 115, 116 and the shaft 130 via the cam follower 117 as the cam follower 117 moves. Alternatively, the upper ends of the springs 115, 116 may be fastened to the cam follower 117 in any desired manner.

The springs 115 and 116 are held compressed during normal operation of the elevator car, at which condition the braking apparatus 100 is in a brake release position. The braking apparatus 100 can be switched from the brake release position, such as shown in FIG. 14A, to obtain a brake applied position, such as shown in FIG. 15A, under abnormal conditions, such as over speeding of the car, or departure of the car from a floor with its door(s) open. When the apparatus 100 is switched from the brake release position to obtain the brake applied position, a brake application cycle occurs.

During a brake application cycle, the springs 115 and 116 are released from a compressed state, and partially decompress from the compressed state to a partially decompressed state, such as shown in FIG. 15A. As the springs 115, 116 decompress from the compressed state, the cam follower 117 is caused to move upwardly. The cam surfaces 120 and 121 are shaped, as indicated in the drawings, so that the spacing of the surfaces 120, 121 from the shoe 123 increases in the upward direction. Accordingly, as the cam follower 117 moves upwardly, following the cam surfaces 120 and 121, the cam follower 117, by way of the connecting arms 118 and 119, pulls the shoe 122 toward the shoe 123 causing the linings 125 and 126 to grip the ropes 2. At the end of the brake application cycle, the apparatus 100 is in the brake applied position and the brake shoes 122, 123 apply a final clamping force to the ropes 2. As the braking linings 125, 126 wear, the springs 115, 116 lengthen, but the cam means is designed to increase the mechanical advantage, thereby providing a powerful, constant clamping force.

The slots 131, 133 of the apparatus may be configured to substantially follow the shape of the cam surfaces 120, 121, and confine respective portions of the shaft 130 therein, such that the slots 131, 133 themselves maintain the cam follower 117 in contact with the cam surfaces 120, 121.

In accordance with aspects of the present disclosure, referring to FIGS. 2 and 4-7, the braking apparatus 100 may include an actuation assembly 160 coupled to the cam follower 117 and operable for setting the braking apparatus 100 to a brake release position, such as is shown in FIGS. 4 and 14A, for example. Throughout the specification, this setting process is also referred to as a brake release cycle or a resetting process. As discussed above, during the brake release cycle, the actuation assembly 160 causes the cam follower 117 to move downward to a position where the springs 115 and 116 are compressed. In addition, the actuation assembly 160 is assembled and interconnected with the components of the apparatus 100 so that release of the springs 115, 116 from a compressed state causes the brake to be applied within a predetermined time from commencement of a brake application cycle, such as within about 0.1-0.2 seconds. Further, it is an additional advantage of the present disclosure that, even under circumstances where the brake release cycle is only partially complete, e.g., the springs are in a partially compressed state, the brake may be successfully applied upon decompression of the springs from such partially compressed state. The actuation assembly 160 may be adapted to provide, at any instance during the brake release cycle when the emergency brake may be applied, a final clamping force that is quickly applied by the brake shoes to a clamping surface of a clamped element, such as the hoisting ropes 2.

Figure 6:
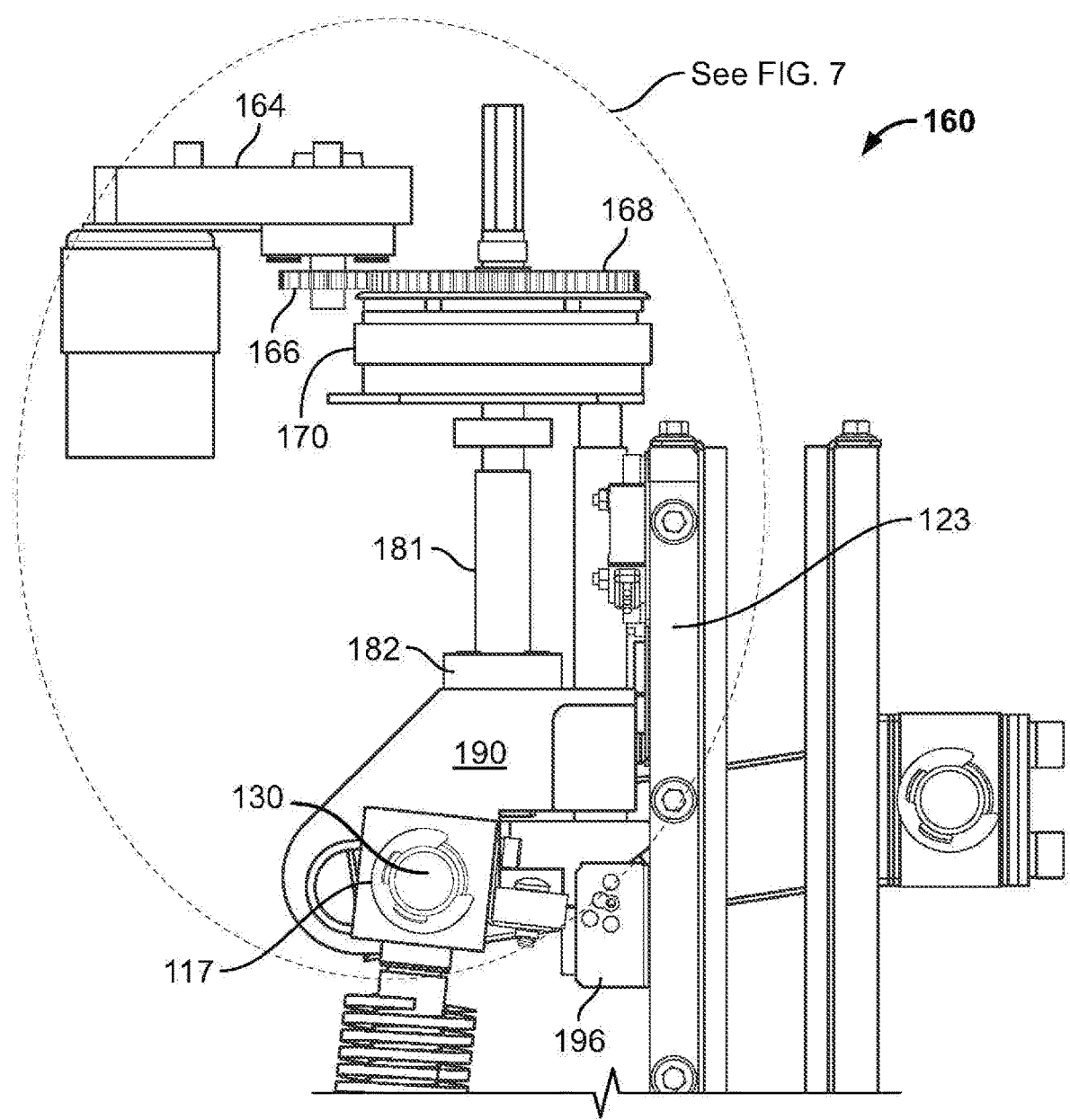
FIG. 6 is a partial side view of the elevator emergency braking apparatus shown in FIG. 1 with some elements hidden for clarity.
Figure 7:
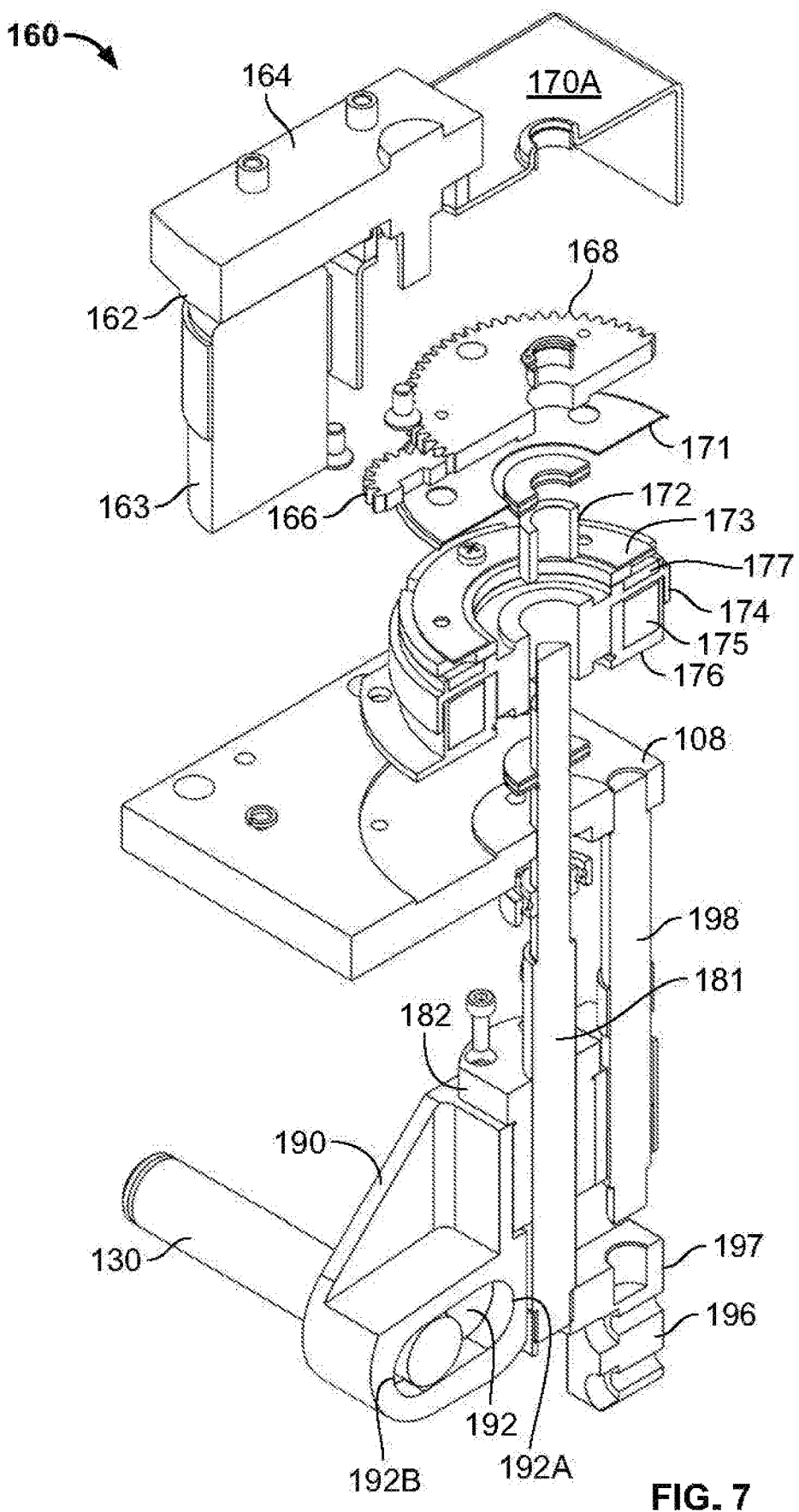
FIG. 7 is an exploded sectional view of an exemplary actuation assembly of the elevator emergency braking apparatus shown in FIG. 1.
Figure 9:
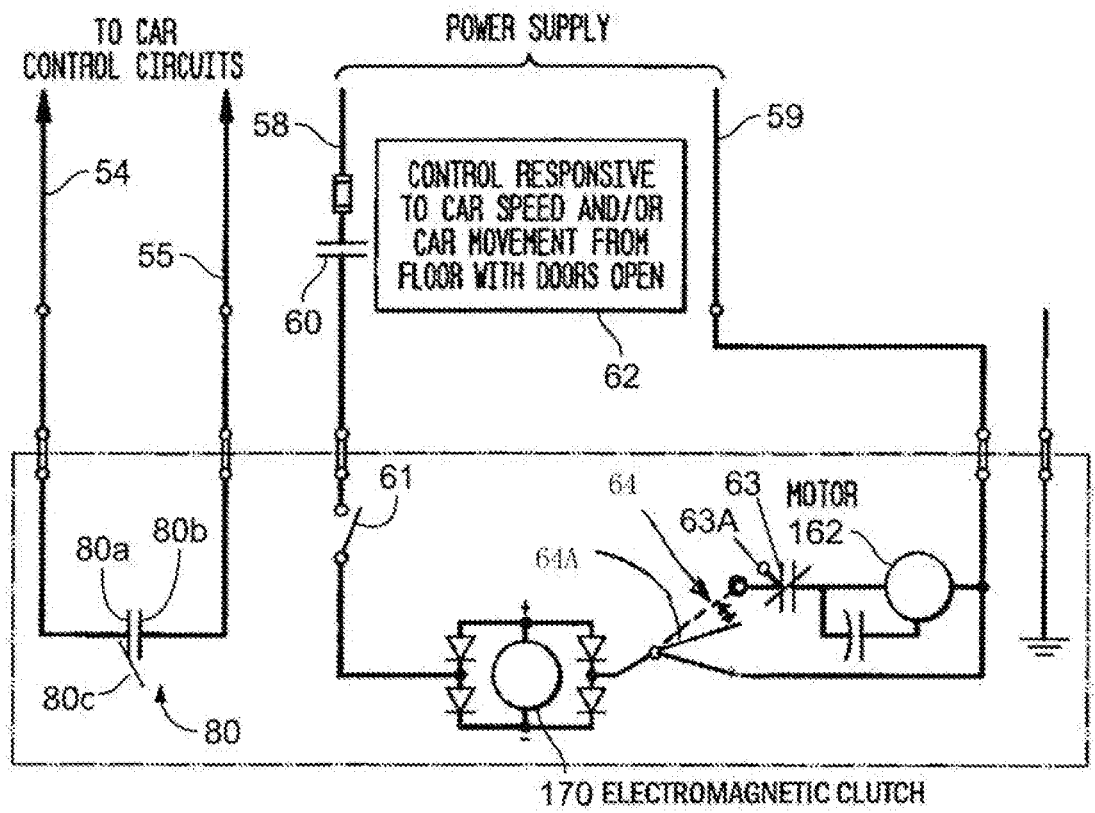
FIG. 9 is a schematic, electrical diagram for use with the elevator emergency braking apparatus of the disclosure.

The actuation assembly 160 may include a motor 162, an electromagnetic clutch 170, a ball screw assembly 180 and a carriage 190, as shown, for example, in FIG. 4, with certain plates and covers removed from the apparatus 100 for clarity. The motor 162 includes a lower part 163 and an upper part 164, both disposed in a motor housing 162A and positioned on a side of the apparatus 100 opposite the brake shoes 122, 123, as shown in FIGS. 2-5. Although described as shown, the motor may vary according to particular specifications of an original equipment manufacturer. The motor 162 may be secured to the side plates 113, 114 of the apparatus 100 and be coupled to motor output gear 166, which is coupled to engagement gear 168, as shown, for example, in FIG. 5. The motor 162 is further connected to a power supply through circuitry as shown in FIG. 9 and described below so that motor can be operated. When the motor 162 is operating, torque is output via a drive axle to the motor output gear 166, attached to the motor beneath upper part 164. As shown in FIGS. 6 and 7, motor output gear 166 engages and interacts with engagement gear 168, which is aligned with and directly above the electromagnetic clutch 170.

The electromagnetic clutch 170 is disposed in a housing 170A arranged adjacent the motor 162 and may be as shown in the figures or it may vary according to particular specifications of an original equipment manufacturer. Referring to FIGS. 6, 7 and 14B, the electromagnetic clutch 170 may include, from an upper extent of the apparatus 100 toward the cam follower 117, an oil stop 171, an armature plate 173, a friction disc 177, an armature 174, a coil 175 and a magnetic yoke 176, i.e., a magnet. The oil stop 171 may function to protect the electromagnetic clutch 170 from exposure to oil passing through the gear 168 or the motor 162 more generally. The armature plate 173 may be fixedly secured to the engagement gear 168, and may further be arranged so that the oil stop 171 may be positioned between the armature plate 173 and the gear 168. The armature 174, including friction disc 177 secured thereto, may be positioned between the armature plate 173 and the magnetic yoke 176. The coil 175 may be sealed within the magnetic yoke 176, which in turn may be secured to the upper plate 108, as shown, for example, in FIG. 7.

The internal components of the electromagnetic clutch 170 may be arranged so that when no power is supplied to the electromagnetic clutch, a gap 179 exists between the armature plate 173 and the armature 174, as shown in FIG. 15B, for example. In one embodiment, this gap ranges from 0.15 mm to 0.25 mm. The electromagnetic clutch 170 may be supplied with power, and connected with a power supply as shown in FIG. 9 and described further below. When power is supplied to the electromagnetic clutch 170, the armature 174 may engage with the armature plate 173 such that the armature 174 is held fixed to the gear 168 via the armature plate 173 and the combination of the armature 174, armature plate 173 and gear 168 may rotate together. In particular, a magnetic force generated by the coil 175 when the clutch 170 is supplied with power may cause at least one of the armature plate 173 and the armature 174 to be drawn to the other, thereby closing the gap 179 between the armature 174 and the armature plate 173 secured to an underside of the engagement gear 168. Ultimately, the magnetic force generated by the coil 175 causes the clutch 170 and the gear 168 to become engaged. This engagement is described in greater detail in the method below. The remaining components within the electromagnetic clutch 170 function as known in the art when supplied with power.

As shown in FIG. 7, a central opening passes through the engagement gear 168 and the various components of the electromagnetic clutch 170. A one-way bearing 172 may be disposed within the opening central to the electromagnetic clutch 170. An outer surface of the one-way bearing 172 is rigidly fixed to an inner surface of the armature 174 defining the central opening, as generally shown, for example, in FIGS. 14B and 15B. An inner surface of the one-way bearing 172 may include pins or other equivalent features that provide for torque transmission when an element inside the one-way bearing is rotated in a first direction while providing no torque transmission when the one-way bearing is rotated in a second, opposite direction.

A ball screw assembly 180 may extend through the central opening of each of the engagement gear 168, the electromagnetic clutch 170 and an opening through the upper plate 108. The ball screw assembly 180 may become engaged with the armature 174 at its upper end via the one-way bearing 172 (FIG. 7). An uppermost portion of the ball screw assembly 180 above the electromagnetic clutch 170 may be free from contact with the engagement gear 168 and the armature plate 173 so that the latter may rotate freely around the ball screw assembly 180.

The ball screw assembly 180 may include a screw 181 and a nut 182, as shown in FIGS. 4, 5, 7 and 14A, for example. The screw 181 may include an outer surface defined by a spiral shaped groove and the nut 182 may include an inner surface with a groove complementary to the groove on the screw 181 (neither groove is shown). The nut 182 may be disposed over and around the screw 181 over a portion of its length, as shown in FIGS. 4 and 7. Further, the nut 182 may be sealed at both of its ends thereby forming an enclosure around the screw 181. A series of ball bearings (not shown), as conventional in a ball screw device, may be contained within the nut 182 disposed between the grooves of the nut interior surface and the grooves of the screw 181 outer surface. The ball bearings may be interspersed along a portion of the path of the grooves between the screw 181 and the nut 182. In one example, the ball bearings may be adjacent to one another throughout a length of the nut 182 and through a return channel inside the nut thereby forming a continuous loop of ball bearings within the nut. In other examples, some space may exist between adjacent ball bearings. While the screw 181 and the nut 182 are in motion, the ball bearings are continuously moving within the nut 182, and when reaching the end of a chamber within the nut 182, are returned to an opposite end of the nut to repeat the same path of travel.

When the screw 181 is caused to be rotated, the ball bearings within the nut 182 may provide for the rotational motion in the screw 181 to be converted into a force causing longitudinal translation of the nut 182 along a length of the screw 181. The translation of the nut 182 in relation to the screw 181, in either direction along the length of the screw 181, may be realized as a smooth motion with minimal friction between the respective components. Advantageously, the ball screw assembly may provide that a small amount of force is needed to convert rotational motion of the screw to linear motion of the nut, or vice versa.

In addition, when the apparatus 100 begins a brake application cycle as described below due to the electromagnetic clutch 170 no longer engaging the engagement gear 168, at which time a force in the springs 115, 116 is no longer resisted, the force from springs resulting from decompression of the springs may be transferred to the nut 182, which forces the nut 182 in the direction of the clutch 170, i.e., in an opposite direction to that described above. The nut 182, when acted upon by the force of the springs decompressing, in turn, transfers a portion of the force through the ball bearings such that the nut 182 may rise rapidly while the screw 181 rotates in a direction opposite that when the nut 182 is driven downward towards the springs. During the brake application cycle, the ball bearings travel in a direction opposite to that when the nut 182 is translated in a downward direction. The ball screw assembly 180 may be designed in various ways to accomplish the above functions as known in the art, any of which may be incorporated into the apparatus 100 of the present embodiment or variants as described elsewhere in the disclosure.

The electromagnetic clutch 170 may be secured to the apparatus 100 through upper plate 108 while the ball screw assembly 180 may be secured to the apparatus 100 via a wall surface of the fixed brake shoe 123. In particular, a ball screw base 197 may be secured to the fixed brake shoe 123 via screw holder 196 adjacent to the springs 115, 116, as shown in FIGS. 6, 7, 8 and 14A, and support both the ball screw assembly 180 and a guiding axle 198. The ball screw assembly 180 may be held by the ball screw base 197 and is at least rotatable about its own longitudinal axis. The guiding axle 198 may provide added stability to the position of the ball screw assembly 180 relative to the apparatus 100 and be positioned between the ball screw assembly 180 and the fixed brake shoe 123. The guiding axle 198 may be fixed into the ball screw base 197 and the upper plate 108.

From the above, it is understood that the ball screw assembly 180 includes the screw 181 and the nut 182, and that at its upper end, the ball screw assembly 180 may be operationally connected with the electromagnetic clutch 170. Toward its lower end, however, the ball screw assembly 180 is operationally coupled with the cam follower 117 and the springs 115, 116 of the apparatus 100 through a carriage 190. As shown in FIG. 4 for example, the carriage 190 may be fixed to the nut 182 and surround a portion of the screw 181, and move in unison with the nut 182. The carriage 190 may include a slot 192 therethrough. The slot 192 passes through the carriage 190 in a direction transverse to a longitudinal axis of the ball screw assembly 180, and in the same direction as the cam follower 117. In the depicted embodiment, the cam follower 117 may be disposed through the slot 192 and extend between the slots 131, 133, as shown in FIGS. 4 and 7, which provide a functional coupling between the actuation assembly 160, the springs 115, 116 and the cam follower 117 via the carriage 190. Thus, when the springs 115, 116 are compressing during a brake release cycle, kinetic energy from the screw 181 of the ball screw assembly 180 rotating in a first direction may be transferred to the cam follower 117 and the springs 115, 116 through the carriage 190, and similarly when the springs 115, 116 are decompressing during a brake application cycle, the force resulting from decompressing the springs 115, 116 may be converted to kinetic energy in the form of a linear translation of the carriage 190 in a direction away from the springs 115, 116.

As shown in FIGS. 6, 7 and 14A, the slot 192 may be oval in shape and be substantially wider than a cross-sectional area of the inner shaft 130 of the cam follower 117 extending within the slot 192, and may travel between an inner end 192A and an outer end 192B. The length of the slot 192 from the end 192A to the end 192B may permit a distance between the cam follower 117 and the closest location on the longitudinal axis through the ball screw assembly 180 to vary depending on the amount of compression in the springs 115, 116. For instance, when the springs 115, 116 are fully compressed, as shown in FIG. 14A, the inner shaft 130 may be positioned at or near the inner end 192A of the slot 192 closest to the ball screw assembly 180. When the springs are fully decompressed, as shown in FIG. 15A, the inner shaft 130 may be positioned at or near the outer end 192B of the slot 192. Additionally, when the springs 115, 116 decompress, their movement is directed by a position of the shaft 130 on the cam surfaces 120, 121, which allows the brake to move from a brake applied position to a brake release position, and back again as described above.

FIG. 9 is a schematic diagram illustrating electrical circuitry that may be added to conventional and known elevator car circuits for controlling the braking apparatus of the present disclosure and for controlling the car operation. The devices within the dashed lines are part of the braking apparatus 100.

As shown in FIG. 9, leads 54 and 55 extend to conventional elevator car circuits which must be completed to permit the elevator car to run. The leads 54 and 55 are in series with the contact element 80 including the contacts 80a and 80a, respectively. The contacts 80a and 80b are electrically coupled to each other only when the springs 115, 116 are compressed. Therefore, the car cannot move via power provided through this circuit if the springs 115 and 116 are not compressed.

Still referring to FIG. 9, leads 58 and 59 extend to the elevator system power supply. The lead 58 is in series with a normally opened control switch or contact 60 and a manually operable, normally closed test switch 61. The test switch 61, when opened, releases the springs 115 and 116 and applies the linings 125 and 126 to the ropes 2. The control switch or contact 60 is representative of contacts or circuits required to meet various elevator operating codes. The switch 60 can be opened by unsafe or otherwise code violating behavior of the elevator car, illustrated by the rectangle 62. Thus, switch 60 is responsive to car speed, and hence, the speed of the ropes 2, and movement of an elevator car from a floor with its doors open. The speed responsive apparatus can, for example, be an elevator governor whose switch will open when an overspeed occurs, or an electrical generator or encoder connected to the sheave 3 which provides an overspeed signal, which is generated dependent on the speed of rotation of the sheave 3. Conventional elevator systems also have circuits which indicate when a car moves from a floor with its door or doors open. Such circuits can, in an obvious manner, open the control switch 60, and also can be part of other circuits which disconnect power.

Figure 8:
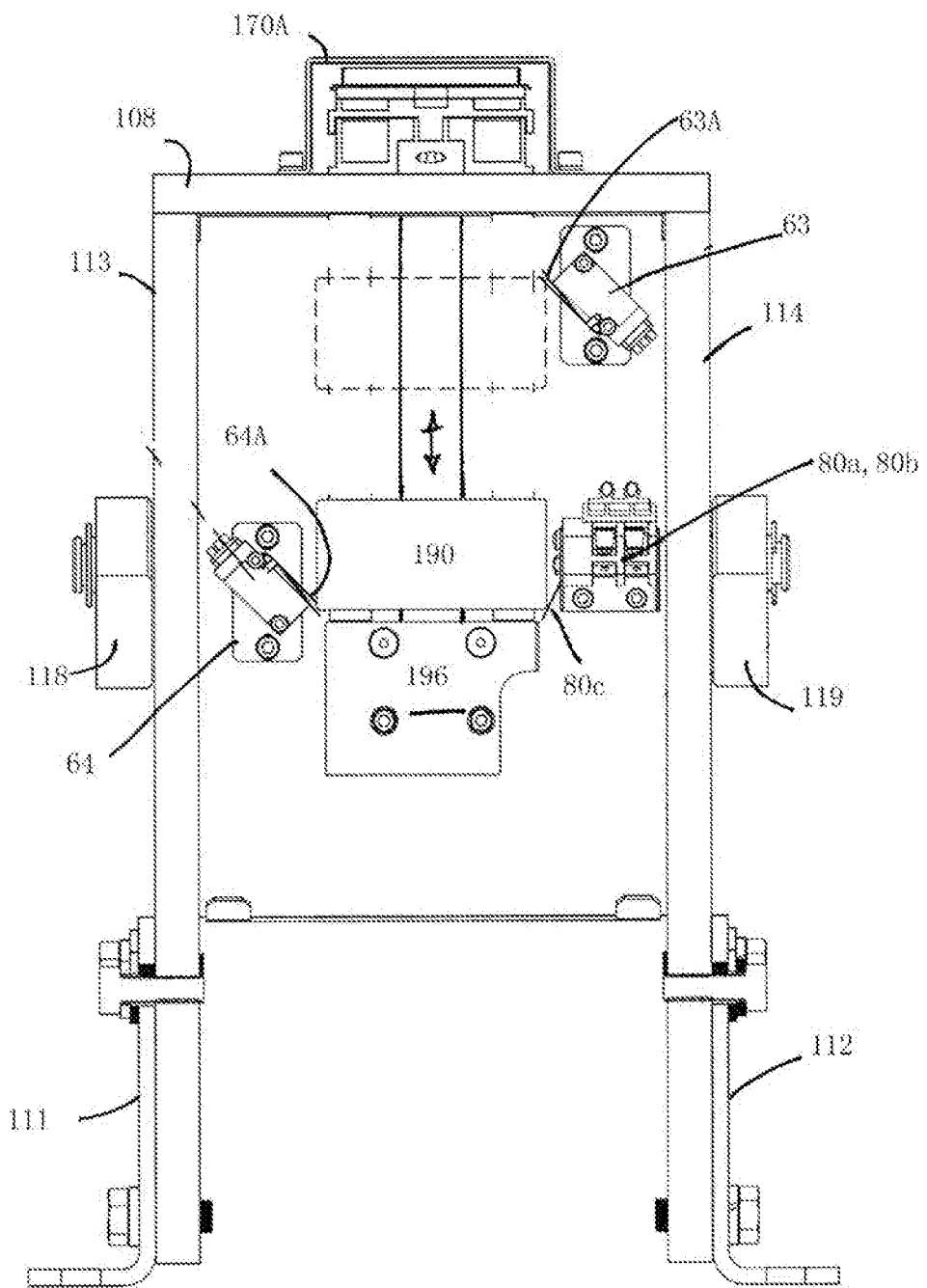
FIG. 8 is sectional view of the elevator emergency braking apparatus of FIG. 1, at cross-sectional line 8-8 shown in FIG. 3.

In one embodiment, as shown in FIG. 8, the apparatus 100 may include three switching mechanisms: Switch 64a to control power supplied to the motor 162, contacts 80a, 80b to control power to the elevator car 4 itself via leads 54, 55 as discussed above, and switch 63 also to control power to the motor 162. As shown in FIG. 8, each of the switches is mounted on an inner surface of the fixed brake shoe 123 facing the ball screw assembly 180.

The switch 64 may be a normally closed switch and positioned adjacent to a lower end of the ball screw assembly 180. The switch 64 may include an arm 64A positioned so that the switch 64 is closed when the arm 64A is not subject to any displacement, which occurs when the carriage 190 is in the brake applied position. When the apparatus 100 transitions from the brake applied position to obtain the brake release position, the carriage 190 contacts the arm 64A to cause the arm 64A to rotate so as to open the switch 64, such that power is not supplied to the motor. Power may be supplied to the electromagnetic clutch 170 so long as the switches 60 and 61 are both closed. Thus, the switch 64 is opened when the springs 115 and 116 approach maximum compression and the carriage 190 is approaching or at its lower limit on the ball screw assembly 180. In one embodiment, the switch 64 may be configured such that a time from transition of the switch 64 from an open position to a closed position is longer than a time from transition from the brake release position to the brake applied position. In addition, the contacts 80a, 80b may be arranged with an arm 80c extending from and rotatable with respect to the contact 80a and biased in a direction away and spaced from the contact 80b. The arm 80c may be positioned and configured to contact the contact 80b when the carriage 190 transitions to and attains the brake release position, where the carriage 190 acts on the arm 80c to cause the arm 80c to rotate toward and ultimately contact the contact 80b, such that the contacts 80a and 80b become electrically coupled to each other, thereby closing a circuit providing power to the control circuits of the elevator car 4. Further, the arm 64A is biased so that it reverts to a position where the switch 64 is closed if no load is applied to it. Thus, the switch 64 is closed again when the brake is applied and the load applied by the carriage 190 is removed from the arm 64A. Also, the arm 80c is biased to revert to a position where the contacts 80a, 80b are not electrically coupled when no load is applied to it. Thus, if a load applied by the carriage 190 is removed from the arm 80c, the arm 80c rotates to uncouple contacts 80a and 80b.

Switch 63 may be positioned adjacent to an upper end of the ball screw assembly 180 immediately under the upper plate 108. The switch 63 is normally closed and may include an activating arm 63A that is rotatable when subject to loading in a manner similar to arms 64A and 80c. Under normal operation, the carriage 190 will not reach arm 63A, however, when the brake linings 125, 126 are subject to excessive wear, the arm 63A may be caused to rotate and open the normally closed switch 63, thereby preventing power from being supplied to the motor 162 such that the motor cannot operate.

When the switches 60 and 61 are closed, automatic powering off of the motor 162 at or near an end of the brake release cycle occurs when the normally closed switch 64 is opened. Switch 64 may only be opened after compression of the springs 115 and 116 is completed. When the switch 64 is opened, the springs 115, 116 remain held in their compressed state based on the engagement between the ball screw assembly 180 and the carriage 190 and the continued operation of the electromagnetic clutch to engage with the engagement gear, as discussed below. If either of the switches 60 or 61 is opened, the electromagnetic clutch 170 becomes de-energized, which releases the springs 115 and 116 from the compressed state, thereby causing the linings 125 and 126 to engage the ropes 2 and arresting movement of the apparatus 100.

The motor 162 is connected in series between the power leads 58 and 59 through normally closed switches 64 and 63. The switch 63 is opened when the wear of the linings 125 and 126 is excessive, e.g., the cam follower 117 reaches the limit of its upward movement; or during decompression of the springs 115, 116 as described below.

In some embodiments, such as that shown in FIG. 12 described below, a sensor or switch associated with the cam follower 117 may be provided which indicates that the springs are fully compressed, and be operably electrically coupled to the switch 63 to cause the switch 63 to open when the brake application cycle begins. Thus, if the switch 63 is opened, the motor 162 cannot operate to compress the springs 115 and 116, and if the switch 64 is opened, which occurs just prior to or at the end of a brake release cycle after the springs 115 and 116 are compressed, power to the motor 162 is disconnected so that the motor 162 stops operating while power continues to be supplied to the electromagnetic clutch 170.

Referring to FIG. 15A, without significant wear of the linings 125 and 126, the cam follower 117 does not reach the top of the cam surfaces 120 and 121. Due to the profile of the cam surfaces 120 and 121, the forces of the springs 115 and 116 are multiplied in conjunction with wear of the linings 125, 126 so that the forces remain constant even when the springs 115, 116 extend due to such wear, until a predetermined amount of wear is reached. Continuing to refer generally to FIG. 15A, when the linings 125 and 126 wear and become thinner, the cam follower 117 moves farther up the cam surfaces 120 and 121 to compensate for such wear, and the carriage 190 contacts the arm 63A to open the normally closed switch 63. Therefore, with the switch 63 open, the braking apparatus 100 remains in the brake applied position, the motor 162 cannot operate even if power is restored, and servicing of the apparatus 100 would be required.

From the foregoing, it is apparent that under normal operating conditions, the springs 115 and 116 are compressed and the shoes 122 and 123 have their linings 125 and 126 spaced apart permitting the ropes 2 to pass freely therebetween, i.e., the apparatus 100 is in the brake release position. However, if the control switch 60 is opened, by reason of either over speeding of the elevator car 4, in either the up or down direction, or movement of the car 4 from a floor with its doors open, the springs 115 and 116 will be released as power ceases to be supplied to the electromagnetic clutch 170, and the linings 125 and 126 will grip the ropes 2 and arrest movement of the car 4. Because the switch 60 controls supply of power through a circuit running through the switch 64, the motor will also remain disconnected as the springs 115, 116 are released. The switch 60 may also include a connection to a user control, so that when the switch 60 is open, e.g., when the brake is applied, a user interface is accessible to allow a user to physically initiate the brake release cycle by closing the switch 60 at the appropriate time.

Figure 10:
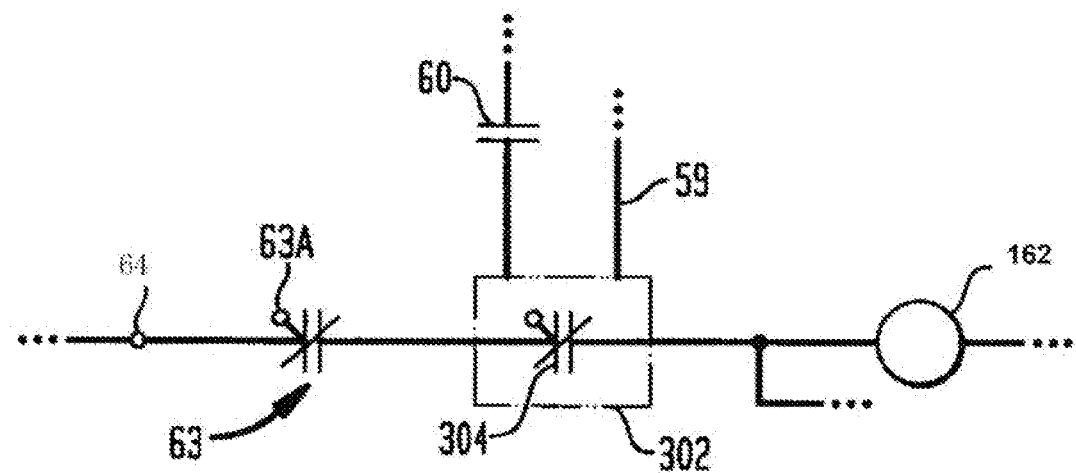
FIG. 10 is a schematic of a portion of an alternative electrical circuit for use with the elevator emergency braking apparatus of the disclosure.
Figure 12:
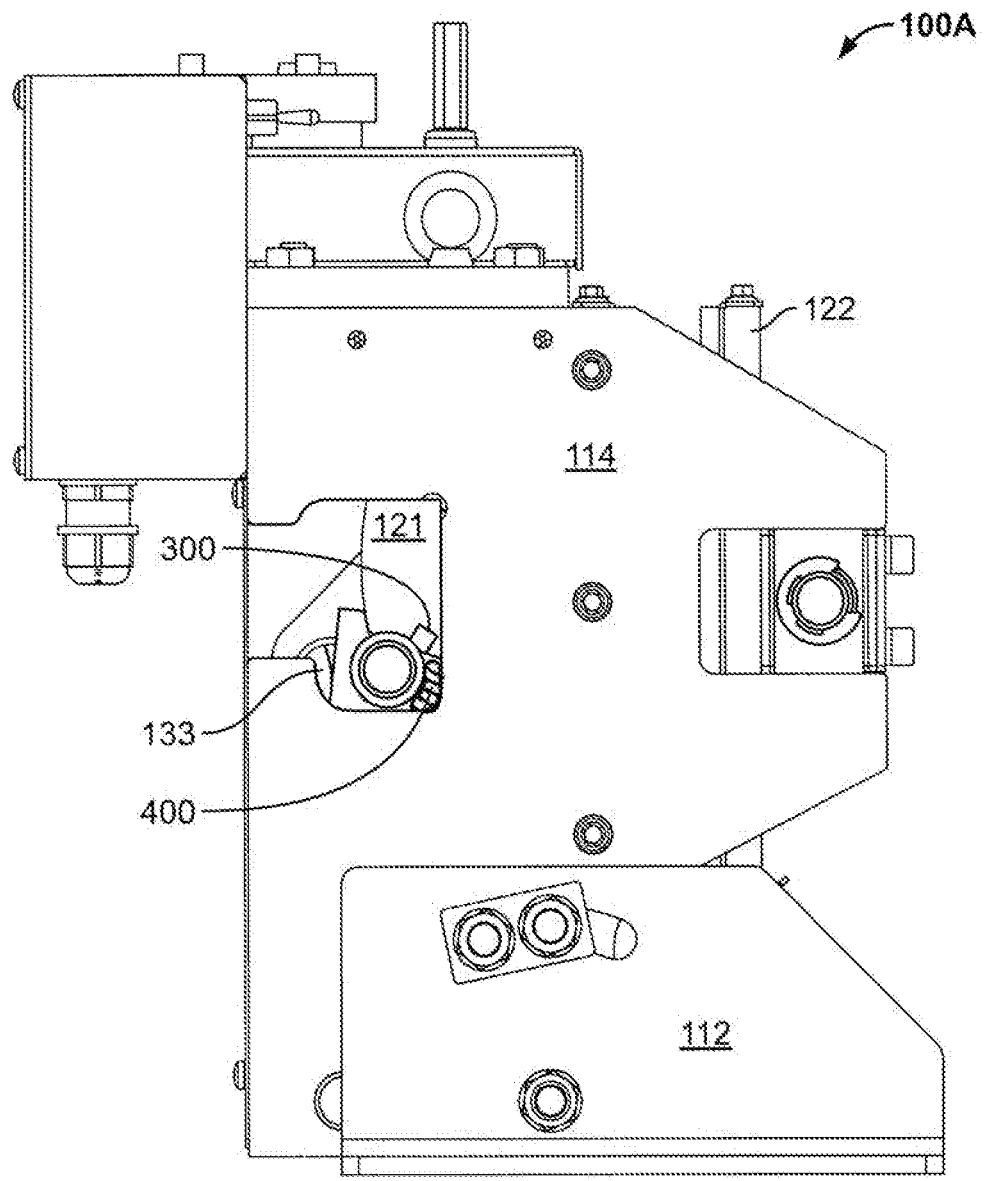
FIG. 12 is a side view of an elevator emergency braking apparatus according to one embodiment of the disclosure.

In a further embodiment, referring to FIGS. 10 and 12, the apparatus 100 may include a sensor 300 positioned at the end 135 of the slot 131, such that the shaft 130 contacts the sensor 300 when the apparatus 100 is in the brake release condition (FIG. 10). The sensor 300 may be part of a sensor assembly 302 including an electronic timer (not shown) and a normally closed switch 304. The electrical circuit of the apparatus 100, shown in FIG. 9, may be adapted to include the sensor assembly 302 shown in FIG. 10. Referring to FIG. 10, the sensor assembly 302 is connected to the lead extending from the switch 60 and the lead 59. In addition, normally closed switch 304 may be electrically connected in series with the motor 162 and the switch 63. The switch 304 is also coupled to the electronic timer. At the start of a brake application cycle, as soon as the shaft 130 no longer contacts the sensor 300, the assembly 302 may provide that the timer is activated. Once the timer is activated, the switch 304 is opened, thereby preventing the motor 162 from being energized. Once activated, the timer counts for a predetermined time interval, after which the assembly 302 causes the switch 304 to return to the normally closed position. Consequently, the sensor 300 may prevent the motor 162 from being energized during a brake application cycle. In an alternative embodiment, the switch 304 of the assembly 302 may be incorporated into known elevator control circuitry.

Figure 11A:
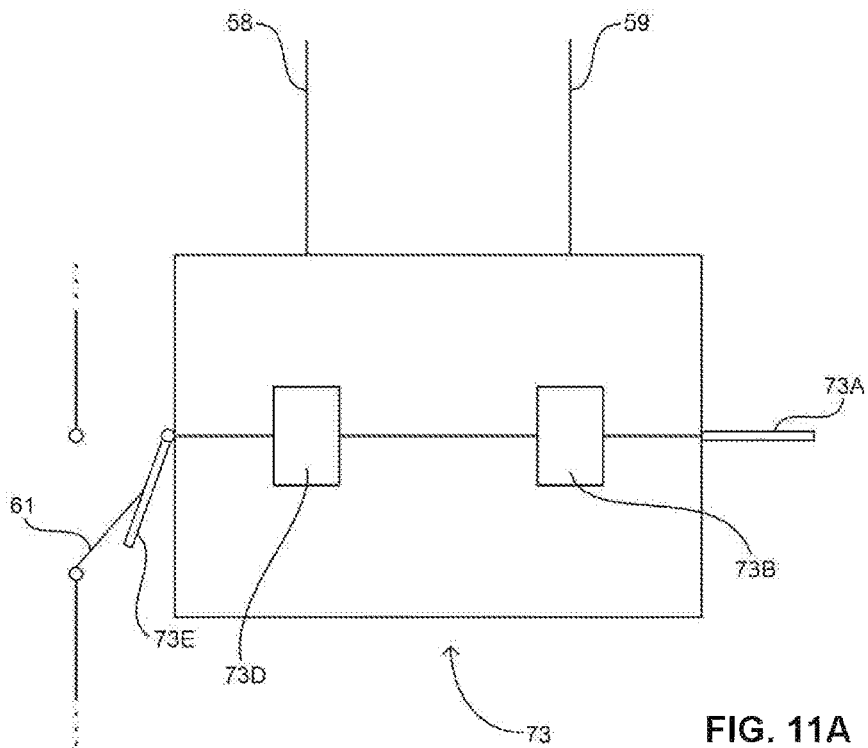
FIG. 11A is a schematic of a portion of another alternative electrical circuit for use with the elevator emergency braking apparatus of the disclosure.
Figure 11B:
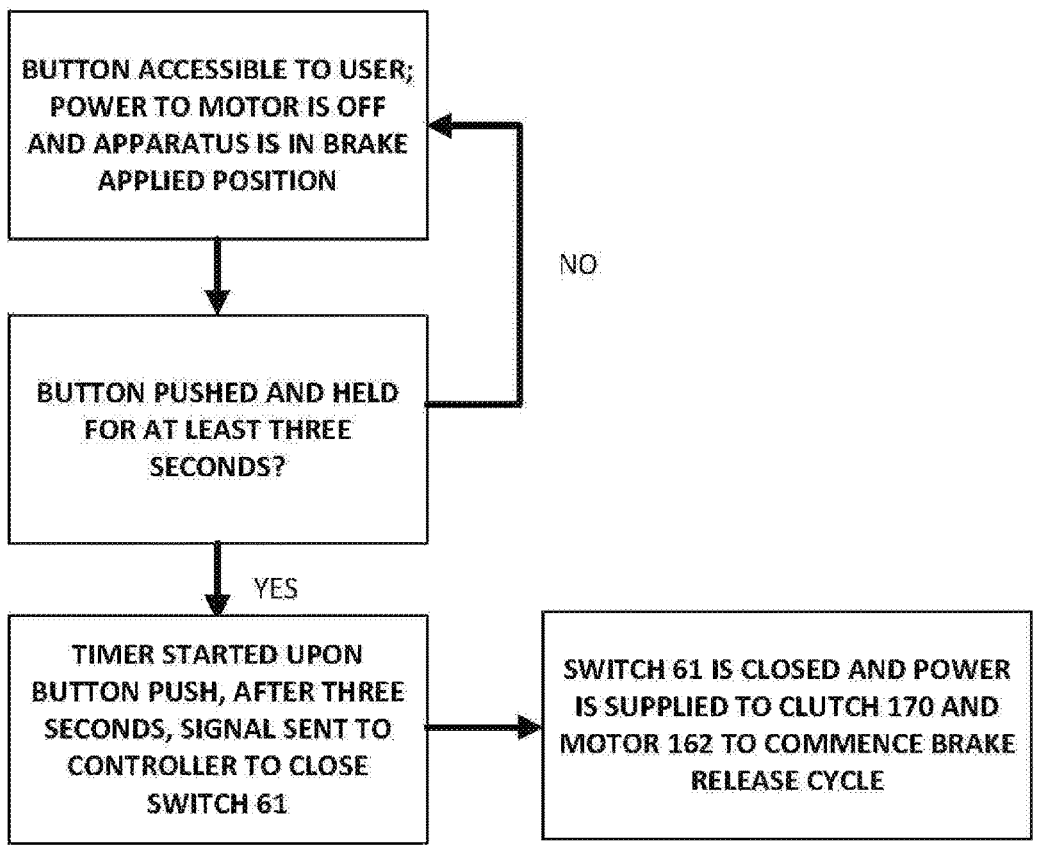
FIG. 11B is a flow chart showing a method of activating a motor and an electromagnetic clutch as part of a brake release cycle according to one embodiment of the disclosure.

In yet another embodiment, the circuitry of FIG. 9 may include a button system 73 to improve ease of use of the apparatus 100, as shown in FIG. 11A and described in the flow chart shown in FIG. 11B. In one embodiment, the button system 73 may be coupled to the leads 58 and 59 and include an actuation button 73A which may be operable to control whether a switch closes a circuit to supply power to the electromagnetic clutch 170 and the motor 162. In one embodiment, the button 73A may be operatively connected to the switch 61 so that actuation of the button 73A causes the switch 61 to close from an open position. In particular, button 73A may be pushed to activate a timer 73B of the system 73 to which the button 73A is mechanically or electrically coupled. The timer continues to operate as long as the button is held and the timer may be programmed to send a control signal to a controller 73D of the system 73 if the timer continues to operate for at least a predetermined time, such as three seconds. When the controller 73D receives the control signal, the controller may cause a close signal to be generated that causes the switch 61 to close, such as by causing an arm 73E normally biased to a position near a housing of the system 73 to rotate away from the housing and contact the switch 61 to cause the switch 61 to move to a closed position. The button system may allow a user to commence the brake release cycle by holding the button for at least three seconds when the apparatus is in the brake applied position. After holding the button for three seconds, the switch 61 will close, thereby causing power to flow through the circuit to activate the electromagnetic clutch 170 and the motor 162 to initiate the brake release cycle and open the brake shoes. Of course, the timer can be programmed to send a signal after any predetermined amount of time or after merely minimal contact with the button by a user. In another embodiment, the button, the timer and the controller can be configured to control the switch 60 in the same manner as described for the switch 61. After the switch 60 is closed via actuation of the button, the switch 60 may be opened again if the elevator exhibits unsafe behavior or other behavior warranting application of the brake. In this way, the switch 60 would be ready for another brake release cycle.

In another embodiment, a braking apparatus 100A includes resilient material, such as a resilient element 400 shown in FIG. 12, that is disposed in slots 131, 133 to decrease the amount of an impact force that may be suddenly applied to the gears of the actuation assembly 160 at the end of a brake release cycle. This may be included with the sensor 300 as shown, or without the sensor 300. As discussed elsewhere in the disclosure, near or at the end of a brake release cycle, the actuation of the arm 64A ordinarily disconnects the motor 162 from the power supply, such that the shaft 130 is no longer driven toward the ends 135, 137 of the slots 131, 133. Referring generally to FIGS. 8 and 12, in the event the switch 64 is misadjusted or not functioning, the motor 162 may continue to operate, such that the upper transverse shaft 130 continues to be driven at the end of the brake release cycle. In such circumstances, in the absence of a means that would slow the motor and also slow the movement of the shaft 130 as the shaft 130 approaches the ends 135, 137 of the respective slots, the shaft 130 would suddenly stop when the shaft 130 comes into contact with a fixed end surface of the apparatus 100A at the ends 135, 137 of the slots. Such contact between the fixed end surface and the moving shaft 130 at the end of the brake release cycle would create a so-called impact force, which may be translated to the ball screw assembly 180, the electromagnetic clutch 170, the gears 166, 168 and the motor 162. The impact force would be a function of the mass and speed of the motor 162 and the ball screw assembly 180, and have the potential of causing damage to the actuation assembly 160.

The resilient element 400 may reduce the amount of an impact force that is transferred, or avoid an impact force from being transferred, to the actuation assembly 160. The gears 166, 168 of the actuation assembly 160 are, thus, protected from becoming damaged at the end of a brake release cycle. Thus, protection is provided if a switch that de-energizes the motor 162 near or at the end of a brake release cycle is misadjusted or not functioning properly. The resilient material may also gradually slow movement of the shaft 130 near or at the end of brake release cycle, even if the switch that de-energizes the motor 162 is operating properly.

Continuing to refer to FIG. 12, in one embodiment, a resilient element 400, for example, a polyurethane plug or spring, is affixed at each of the ends 135, 137 of the slots 131, 133, respectively. The element 400 would contact the shaft 130 when the shaft 130 moves into the slots 131, 133 and approaches the ends 135, 137. Resilient material within the element 400 acts to oppose, and thus slow, movement of the shaft 130 toward the ends 135, 137 near or at the end of the brake release cycle. Consequently, the element 400 would become partially compressed. For example, if the motor 162 remains improperly energized during a brake release cycle, the motor 162 gradually slows down and stalls as the resilient element 400, e.g., plugs, are partially compressed, thereby avoiding too large of an impact force being generated and then acting upon the gears of the actuation assembly 160 to potentially cause damage to the gears.

In some embodiments, at the start of a brake application cycle, a resilient member in the form of plugs decompress, which initially accelerates the movement of the shaft 130 away from the ends of the slots and, thus, initially accelerates movement of the brake shoe 122 toward the brake shoe 123.

Figure 13:
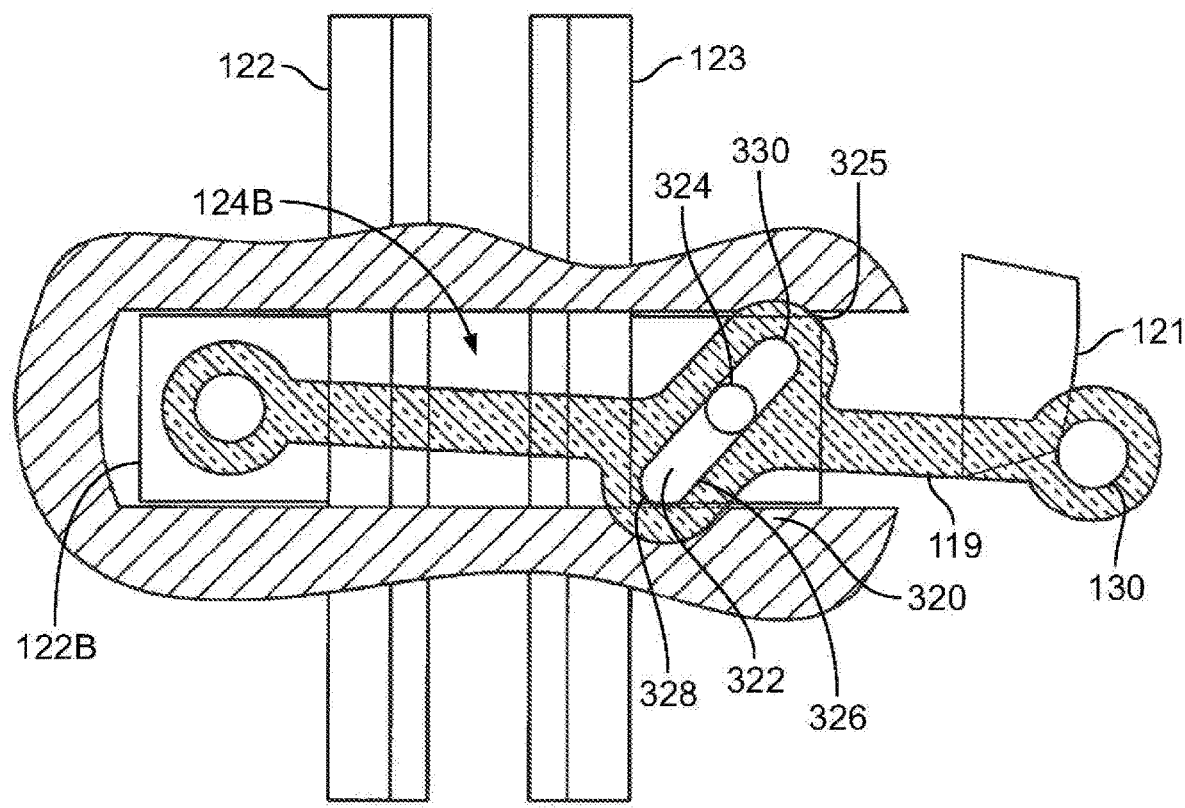
FIG. 13 is a schematic, side elevation view of a portion of an exemplary braking apparatus having two movable brake shoes.

Referring to FIG. 13, the connecting arm 119 may include a cam slot link 320 having an inner surface 326 defining a cam slot area 322. The slot area 322 has a lengthwise dimension extending between a bottom end 328 and a top end 330 of the connecting arm 119. In addition, a block 325 is affixed to the brake shoe 123, in the same manner that the block 122B is affixed to the shoe 122, such that the block 325, with the affixed shoe 123, is slidable within the recess 124B. The block 325 includes a cam follower 324, which is received in the cam slot area 322 of the connecting arm 119. The lengthwise dimension of the area 322 is angled in relation to the lengthwise dimension of the connecting arm 119, such that with the connecting arm 119 pivotally attached to the block 122B and also attached to the block 325 at the cam slot link 320, the bottom end 328 is closer to the block 122B than the top end 330. Therefore, during decompression of the springs 115, 116, as the shaft 130 moves upwardly along the cam surface 121 as shown in FIG. 13, the cam slot link 320 also moves upwardly, the block 122B moves toward the cam surface 121 in the recess 124B, and the cam follower 324 slides along the inner surface 326 toward the bottom end 326 of the cam slot link 320. The cam slot area 322 is angled sufficiently away from the block 122B, such that as the block 122B moves toward the cam surface 121, the block 325 moves in a direction opposite to the cam surface 121, and hence the brakes 122, 123 move toward each other. During compression of the springs 115, 116, when the shaft 130 moves downwardly along the cam surfaces 120, 121, the connecting arm 119 also moves downwardly, and the cam follower 324 slides along the inner surface 326 of the link 320 toward the top end 330, such that the blocks 325 and 122B move away from each other, and thus the brakes 122, 123 move away from each other.

In another aspect, the present disclosure relates to a method of operating the apparatus 100. Overall, the apparatus 100 functions to both apply and release a brake to grip an object such as a rope or ropes of an elevator. Various triggering events may be linked to the mechanical operation of the apparatus 100 as deemed pertinent to its intended use. In the following embodiments, the configuration and operation of the apparatus 100 is tailored for use with a traction elevator, though it is contemplated that the features described may be employed in other contexts.

In one embodiment, the apparatus 100 is in the brake release position as shown in FIG. 14A. This condition is the one present during normal operation of the elevator car, at which condition the braking apparatus 100 is fully reset, i.e., the brake shoes are spread apart at or close to a maximum amount. As described above, while the switch 64 is open and the arm 64A is actuated, and while contacts 80a and 80b contact each other via arm 80c, the elevator can operate normally. The electromagnetic clutch 170, which is supplied with power, provides for a magnetic force being generated by the coil 175, which keeps the armature 174 engaged with the armature plate 173, as shown in FIG. 14B. Under these conditions, the ball screw assembly 180 is held fixed to the armature 174 through the one-way bearing 172. At the same time, the springs 115, 116 are held compressed. The potential energy in the compressed springs is resisted by the ball screw assembly 180. In particular, the screw 181 is held static by its engagement to the armature 174 via the one-way bearing 172, and since the armature 174 is held fixed relative to the motor 162 via its securement to the engagement gear 168, the screw 181 is held fixed relative to the motor 162. In this manner, the ball screw assembly 180 supplies sufficient force in a direction of the springs to maintain the springs 115, 116 in a compressed state. Indeed, any forces acting on the ball screw assembly 180 due to the springs are insufficient to drive the gear 168 in a direction opposite its driving direction while the electromagnetic clutch 170 is powered on.

Continuing with the description of the fully reset brake release position, the brake shoes 122, 123 are spread apart in conjunction with the position of the shaft 130 on the cam surfaces 120, 121 at or near ends 135, 137 and through the slot 192 of the carriage 190. In particular, with the carriage 190 located at a lower extent of the ball screw assembly 180, the shaft 130 is positioned at the inner end 192A of the slot 192. As visible in FIG. 14A, cam surfaces 120, 121 and corresponding slots 131, 133 in the side plates 113, 114, respectively, direct the shaft 130 to an innermost location along its path of travel when the springs 115, 116 are fully compressed. In this position, the brake shoe 122 is at its furthest position from the ball screw assembly 180, as shown for example, in the partial view of FIG. 5.

While the electromagnetic clutch 170 remains supplied with power, the apparatus 100 remains in the fully reset position with the brake shoes 122, 123 open, or spread apart, as shown in FIG. 14A. From the brake release, i.e., fully reset, position, the brake application cycle is triggered when power is no longer supplied to the electromagnetic clutch 170. This power interruption may be due to a number of possible causes. For example, power supplied to the electromagnetic clutch 170 may be cut off if the source of the power is shut down. In another example, a circuit between a sensor responsive to a triggering event related to the elevator car 4 and the switch 60 may cause the switch 60 to open, thereby causing power to no longer be supplied to the electromagnetic clutch 170. A triggering event may be overspeed of the elevator car, departure of the car from a floor with its door(s) open, or violation of any other predetermined safety measure monitored by a sensor connected to the electromagnetic clutch 170 through circuitry. From the brake release position, as described above, the brake application cycle is commenced when power is no longer supplied to the electromagnetic clutch 170. When this occurs, the electromagnetic clutch 170 demagnetizes and the armature 174 and the armature plate 173 become separated from each other, leaving the gap 179 in between, as shown in FIG. 15B. Furthermore, when this occurs, the ball screw assembly 180 is no longer held in place through the resistive forces provided by the fixed motor 162 because the engagement gear 168 is no longer secured to the armature 174, and the only connection between the screw 181 and these elements is to the armature 174 via the one-way bearing 172. Therefore, the ball screw assembly 180 no longer provides a countering force sufficient to resist the forces within the compressed springs 115, 116. As a result, the forces in the compressed springs 115, 116 are released through the decompression of the springs, causing the carriage 190 to move upward with the springs 115, 116 via the cam follower 117 (FIG. 15A).

During the brake application cycle, when load from the cam follower 117 is applied to the nut 182, the ball bearings between the nut 182 and the screw 181 are caused to spiral around the grooves on either side of the bearings in a downward direction within the nut. In some embodiments, as the bearings reach the bottom of the nut, the bearings cycle back within a channel in the nut and spiral downward again. In other circumstances, while the electromagnetic clutch 170 is powered on or while the electromagnetic clutch 170 and the motor 162 are powered on, the ball screw assembly 180 counters and otherwise resists the forces acting in a direction away from the springs 115, 116 based on compression of the springs 115, 116. However, when power is not supplied to the electromagnetic clutch 170, the screw 181 may freely rotate in a direction opposite than it rotates during a brake release cycle. Thus, the screw 181 may begin to rotate about its axis as the forces from the moving ball bearings act on the screw 181. To prevent damage to the armature 174 as the screw 181 rotates at increasing speed, the screw 181 becomes disengaged from the armature 174 at the one-way bearing 172, which at least limits the rotation of the armature 174 in a direction opposite its normal rotational direction. Because of the forces applied to the screw 181 from the springs 115, 116, the speed of rotation of the screw 181 may become quite high during the brake application cycle. With the removal of torque transfer between the ball screw 180 and the armature 174 with this direction of rotation due to the operational configuration of the one-way bearing 172, and also because the armature 174 is disengaged from the gear 168 and motor 162 at this time, the screw 181 acts freely of the gear 168, such that the rotation does not impact the gears or the motor. Thus, the nut 182 with the carriage 190 fixed thereto rapidly rises to the brake applied position as the screw 181 spins about its axis with the ball bearings spiraling downward within the nut 182, as there is minimal or no resisting force in the screw 181 to counter the upward forces from the springs 115, 116. It should be noted that once the carriage 190 begins rising on the screw 181, the arm 64A rotates to provide that the switch 64 may return to the normally closed position. In addition, the arm 80c no longer contacts contact 80b.

In the apparatus as depicted, the shaft 130 of the cam follower 117 moves upward following cam surfaces 120, 121, thereby controlling the movement of connecting arms 118, 119 during the brake application cycle. Although only one cam surface 120 is visible in FIG. 15A, each end of the shaft 130 at respective cam surfaces 120, 121 moves in unison, as is apparent with a view to FIG. 4. The cam surfaces 120 and 121 are shaped, as indicated in FIGS. 4 and 14A, so that the spacing of the surfaces 120, 121 from the brake shoe 123 is greater at higher locations on the apparatus 100. Accordingly, as the cam follower 117 moves upwardly following the cam surfaces 120 and 121, the cam follower 117, by way of the connecting arms 118 and 119, pulls the shoe 122 toward the shoe 123 causing the linings 125 and 126 to grip the ropes 2. During this process, because the cam surfaces 120, 121 are located further away from the shoe 123 higher on the apparatus 100, as shown in FIGS. 7, 14A and 15A, the shaft 130 slides toward the outer end 192B of the slot 192 as the springs decompress. This allows for further decompression of the springs prior to engagement between brake shoes 122 and 123, as the springs can extend further when the shaft 130 is abutting the outer end 192B of the slot 192 than the inner end 192A. As the motor 162 is decoupled from the armature 174 of the actuation assembly 160 during a brake application cycle, a brake applied position may be obtained within a predetermined time, such as within about 0.1-0.2 seconds, from the commencement of a brake application cycle. At the end of the brake application cycle, the apparatus 100 is in the brake applied position and the brake shoes 122, 123 apply a final clamping force to the ropes 2.

As the brake linings 125, 126 wear, the springs 115, 116 lengthen, but the cam means is designed to increase the mechanical advantage, thereby providing a powerful, constant clamping force. In one typical application of the apparatus 100, five hundred pound-force springs 115, 116 are used and, when released, cause the brake shoes to apply a constant five thousand pound final clamping force to the ropes 2 at the end of the brake application cycle.

Continuing with the above embodiment, once the problem that caused the brake to be applied in the first instance is addressed and the elevator is ready for operation again, the resetting process is employed to place the apparatus 100 in the brake release position, i.e., fully reset, so it is ready to be employed again. This process of resetting is also referred to as a brake release cycle, as noted above. Initially, a user confirms that the primary braking mechanisms of the elevator are functional and that the elevator is stable according to applicable codes, standards and techniques as known in the art. The switch 60, which would be open following irregular operation of the elevator car, is now closed by a user so that power may reach the apparatus 100 and elevator again to begin the brake release cycle. In some variants, a user may control the closure of the switch 60 to activate the electromagnetic clutch 170 and the motor 162 via the button as described above. Alternatively, the normally closed test switch 61 may be configured to be open after the brake application cycle and be similarly connected to the button of the system 73 for supplying power to the actuation assembly. At such time, and indeed when it is deemed safe, the brake release cycle commences.

Initially, the motor 162 is activated, causing a drive axle extending from the upper portion 164 of the motor, along with the gear 166, to rotate. Through interconnection of the gear 166 with the engagement gear 168, the gear 166 causes the engagement gear 168 to rotate in an opposite direction. Because the coil 175 of the powered on electromagnetic clutch 170 generates a magnetic force to cause the armature plate 173 secured to a bottom surface of the engagement gear 168 to engage with the armature 174, the torque in the engagement gear 168 transmits directly into the armature 174, which rotates in unison with the engagement gear 168. As the armature 174 begins to rotate, the pins, or other equivalent features, within the one-way bearing 172 translate to engage with the screw 181, thereby forming a locked, torque-transmitting connection between the armature 174 and the screw 181. Accordingly, each of the gear 168, the plate 173, the armature 174, and the screw 181 rotate together such that the torque generated by the motor 162 is transmitted to the screw 181. As the screw 181 rotates, the torque in the screw is transferred to the nut 182 via ball bearings (not shown) inside the nut 182. In particular, as the screw 181 rotates, the ball bearings inside the nut run spirally upward while partially disposed in the grooves of the screw 181 and in corresponding grooves on an interior surface of the nut 182. This allows the rotational motion in the screw 181 to be transferred into linear motion in the nut 182 via the ball bearings. Further, because the carriage 190 is fixed to the nut 182, the linear translation that occurs in the nut 182 is commensurate with a linear translation of the carriage 190. Through this process, the screw 181 remains vertically stationary and only moves rotationally about its axis.

As the carriage 190 moves downward toward its lower limit, the cam follower 117 moves with the carriage 190 and the springs 115, 116 compress. Provided that the motor 162 continues to run, this process continues until the carriage 190 reaches the lower limit near a lower end of the ball screw assembly 180 corresponding to the fully reset position shown in FIG. 14A. Toward the lower limit of the carriage 190, a surface on the carriage contacts and pushes the arm 64A, causing the switch 64 to open. In so doing, the motor 162 shuts off and the electromagnetic clutch 170 remains powered on. This completes the brake release cycle. In one example, a brake release cycle takes place over a duration of approximately 5-10 seconds. This encapsulates a period from activating the motor 162 to the deactivation of the motor 162 via arm 64A. Additionally, when the motor 162 is not driving the gear 166 at the end of the brake release cycle in the brake release position, the one-way bearing 172 is maintained locked to the screw 181 such that the screw 181 is fixed in position, and thus the compressed springs 115, 116 cannot decompress. At this time, resistance in the screw 181 is provided through a fixed connection to the motor 162 via the armature 174 and gears 166, 168 in between.

In a variation of the above brake release cycle, it is possible that the motor 162 will stop functioning or otherwise shut down during the cycle. In these types of circumstances, a problem may exist where, despite power to the elevator being off (contacts 80a and 80b are open), the elevator may begin to rise or fall uncontrollably or exhibit other unsafe behavior that could leave the elevator vulnerable in the absence of an emergency brake. However, the apparatus 100 is advantageously designed to accommodate such scenarios during the brake release cycle. Beginning again with the apparatus 100 in the brake applied position, as shown in FIG. 15A, the brake release cycle begins in the same manner as above with the electromagnetic clutch 170 being supplied power and the motor 162 activated and operating to cause the carriage 190 to translate downward and the springs 115, 116 to compress.

Figure 16:
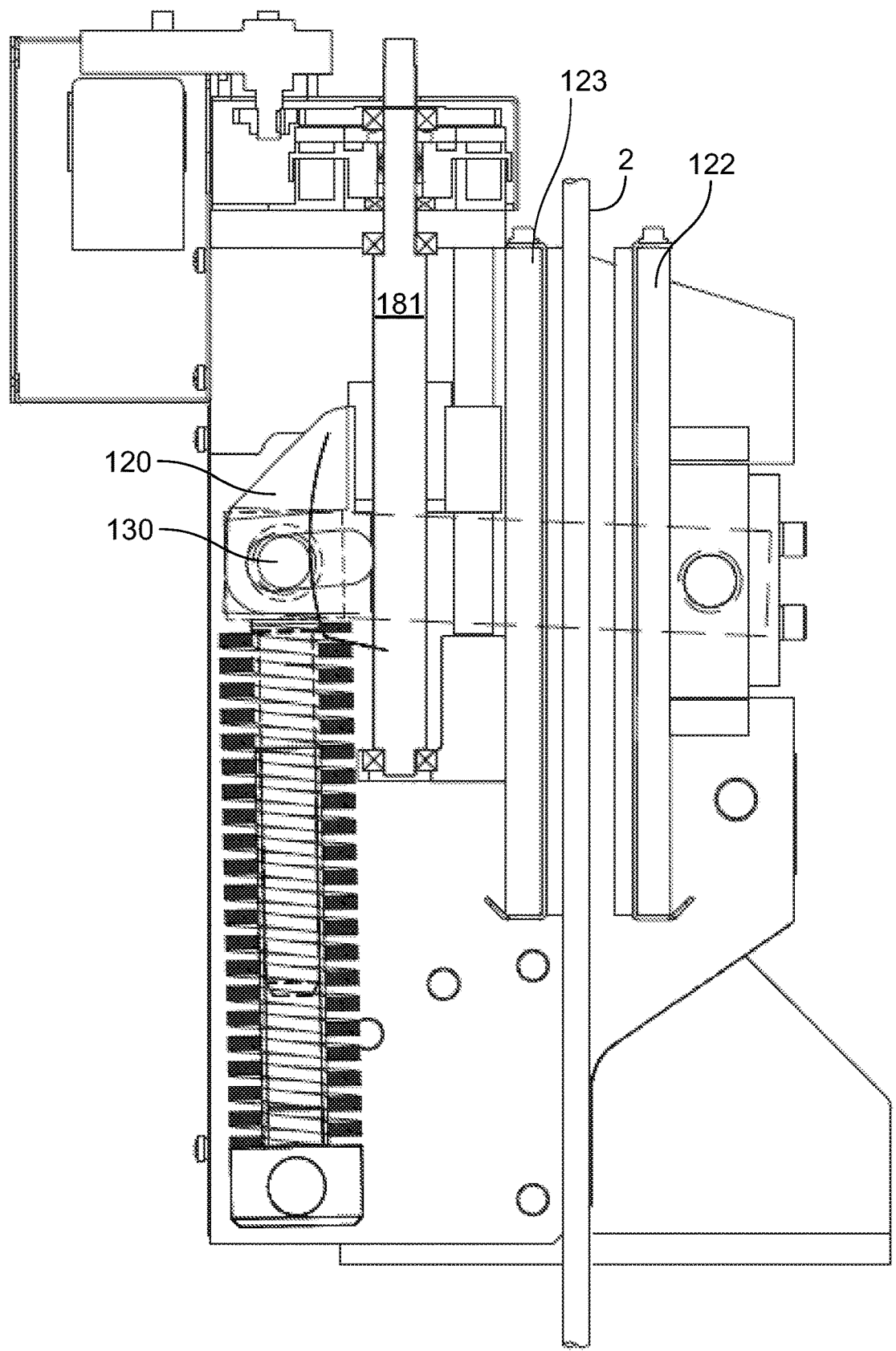
FIGS. 16-17 are cross-sectional views of an elevator emergency braking apparatus at various steps of a method of operating the elevator emergency braking apparatus.
Figure 17:
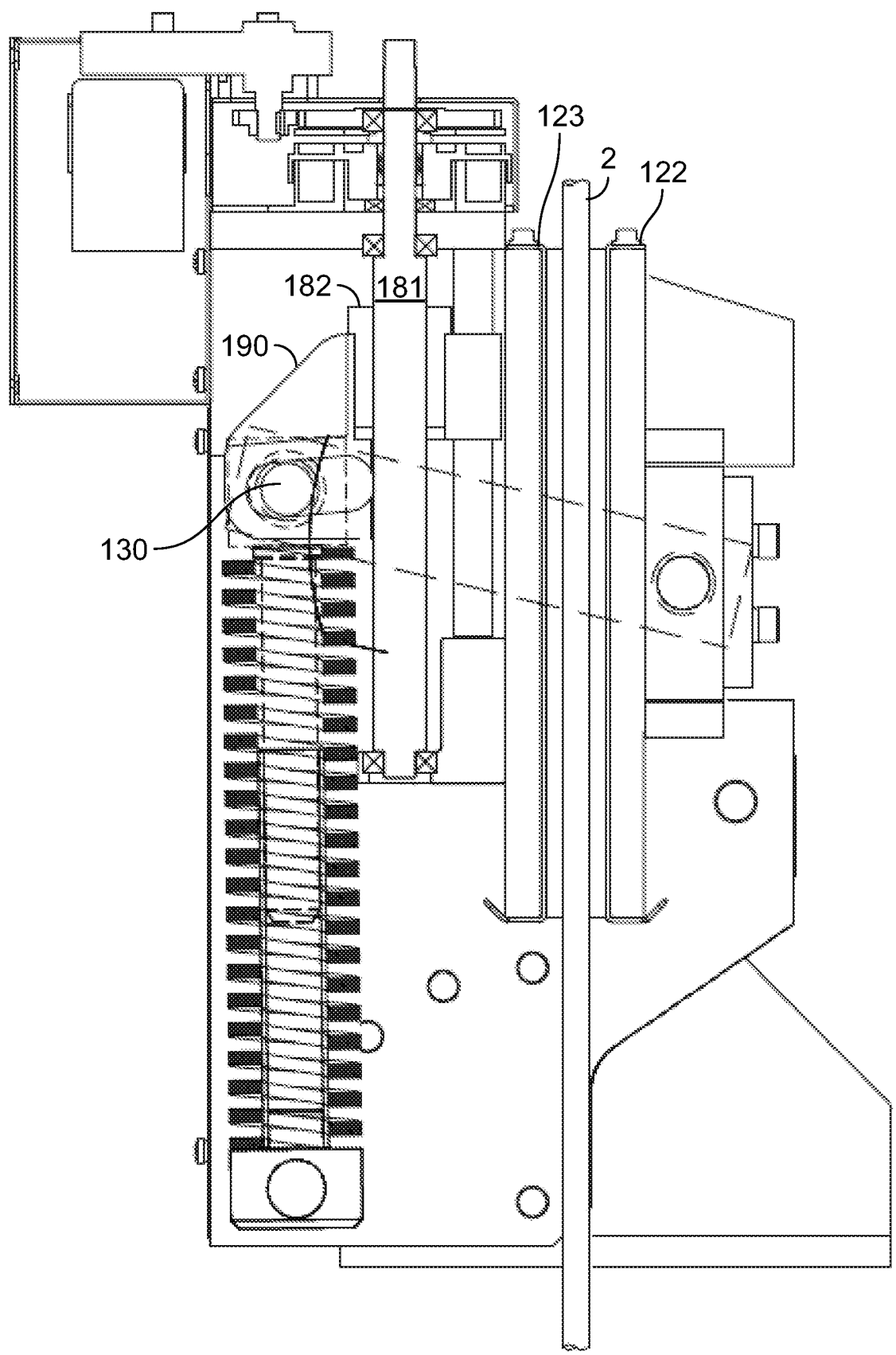

Part way through the brake release cycle, for example, when the carriage 190 is approximately midway along its full range of translation between its upper position and its lower position, the apparatus 100 is as shown in FIG. 16. At this time, the shaft 130 is travelling along the cam surfaces 120, 121 and the movable brake shoe 122 is moving away from the fixed brake shoe 123. Unlike a complete brake release cycle, however, in this example, the electromagnetic clutch 170 and the motor 162 abruptly lose power or otherwise stop functioning at this midway point in the brake release cycle. Until the electromagnetic clutch 170 and the motor 162 are no longer is supplied power, the torque applied through the motor 162 and transferred to the screw 181 provides sufficient resistance to counter the forces in the springs 115, 116 which are at least partially compressed. When the electromagnetic clutch 170 is no longer supplied power, however, the screw 181 no longer resists the springs, and the potential energy in the compressed springs 115, 116 may be released, causing the springs to decompress and thereby causing the cam follower 117 and the carriage 190 to rise rapidly. Specifically, the cam follower 117 and the carriage 190 rapidly transition from the position in FIG. 16 to the brake applied position in FIG. 17. The interaction between the nut 182 and the screw 181 of the ball screw assembly 180 during this step is the same as that occurring during a brake application cycle from the fully reset position, as described above.

Although described for a "midway point" of a brake release cycle, the above brake application cycle may be performed at any point during the brake release cycle with similar results. Indeed, it is important to note that even when the brake is applied from a partially reset position, such as that shown in FIG. 16, the moving brake shoe 122 may apply a minimum predetermined force against the fixed brake shoe 123 upon decompression of the springs. This ensures that the applied gripping force on the ropes 2 is sufficient to hold the ropes between the brake shoes irrespective of at what point in the brake release cycle the brakes are applied. This feature provides a significant improvement in the safety of the emergency brake, as not only does it provide for brake application based on particular triggering events relating to the operation of the elevator, but it also protects the elevator in the event of a problem occurring during a brake release cycle for the apparatus 100.

It should also be appreciated that when the above embodiments describe rotation of the screw of the ball screw assembly in one direction during the brake application cycle, the rotation of the screw can be clockwise or counterclockwise. It then follows that the rotation of the screw during the brake release cycle would be in the opposite direction from that during the brake application cycle.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrange-

The invention claimed is:

1. A braking apparatus comprising:
a pair of brake shoes having facing surfaces, wherein at least one of the shoes is mounted for movement of its face toward the face of the other of the shoes;
a cam follower connected to the at least one of the shoes for moving the face of the at least one of the shoes relative to the face of the other of the shoes;
a compressible spring connected to the cam follower for actuating the cam follower and thereby causing the face of the at least one of the shoes to move relative to the face of the other of the shoes;
an actuation assembly connected to the cam follower and acting through the cam follower for compressing the compressible spring, the actuation assembly including an electromagnetic clutch and a ball screw assembly in between the electromagnetic clutch and the cam follower, the actuation assembly configured so that:
(i) under a supply of power to the actuation assembly, the electromagnetic clutch engages with the ball screw assembly to apply a controlled force onto the cam follower and the at least one of the brake shoes to move the brake shoes from a brake applied position at a start of a brake release cycle to a brake release position at an end of the brake release cycle, the brake applied position being defined by the apparatus having one of the shoes applying a force to the other of the shoes and the brake release position being defined by the faces of the shoes having a distance therebetween, and
(ii) without the supply of power to the actuation assembly, the actuation assembly applies less force on the cam follower and the at least one of the brake shoes than an opposing force in the compressible spring, and:
(a) when power is no longer supplied to the actuation assembly in the brake release position, at least a portion of the electromagnetic clutch disengages from the ball screw assembly and the brake shoes move from the brake release position at a start of a brake application cycle to the brake applied position at an end of the brake application cycle, and
(b) during performance of the brake release cycle when the brake shoes are in between the brake applied position and the brake release position, a loss of power supplied to the electromagnetic clutch causes the portion of the electromagnetic clutch to disengage from the ball screw assembly and the brake shoes return to the brake applied position; and
wherein the actuation assembly holds the compressible spring in its compressed state upon completion of the brake release cycle to maintain the brake release position and releases the compressible spring from the compressed state when the portion of the electromagnetic clutch disengages from the ball screw assembly at the start of the brake application cycle,
wherein, upon release of the compressible spring from the compressed state at the start of the brake application cycle, the compressible spring actuates the cam follower and moves the face of the at least one of the shoes toward the face of the other of the shoes to obtain the brake applied position, wherein the brake applied position is obtained within a predetermined time from the release.

2. The apparatus of claim 1, wherein the ball screw assembly includes a screw and a nut moveable relative to the screw, the ball screw assembly configured to (1) convert a rotational motion of the screw in a first direction into a downward linear motion in the nut during the brake release cycle and (2) convert an upward linear motion in the nut into a rotational motion of the screw in a second direction during the brake application cycle, the first direction being opposite the second direction.

3. The apparatus of claim 2, wherein the actuation assembly includes a carriage with a slot therein, the carriage fixed to the nut of the ball screw assembly and the cam follower disposed in the slot such that the cam follower is closer to a first end of the slot in the brake applied position and closer to a second end of the slot in the brake release position, the first end being opposite the second end.

4. The apparatus of claim 3, further comprising a cam surface having a surface shaped so that the cam follower gradually moves from or near the first end of the slot in the carriage to or near the second end of the slot in the carriage during the brake release cycle.

5. The apparatus of claim 2, wherein the power is supplied to a motor of the actuation assembly such that the motor is powered on during the brake release cycle and is powered off during the brake application cycle, the motor causing the screw to rotate in the first direction during the brake release cycle.

6. The apparatus of claim 5, further comprising a switch and an actuation mechanism coupled to the power supply, the actuation mechanism having a first position and a second position, the actuation mechanism moving from the first position to the second position when the apparatus moves into the brake release position, wherein in the first position power is supplied to the motor and in the second position no power is supplied to the motor.

7. The apparatus of claim 6, wherein the actuation assembly further comprises an engagement gear (1) engaged with the electromagnetic clutch when the electromagnetic clutch is supplied with power and (2) engaged with the screw and transferring torque from the motor to the screw when the motor is supplied with power.

8. The apparatus of claim 7, wherein the actuation assembly further comprises a one-way bearing fixed to the electromagnetic clutch, the one-way bearing providing an engaged connection between the electromagnetic clutch and the screw when the screw rotates in the first direction and being disengaged from the screw when the screw rotates in the second direction.

9. The apparatus of claim 6, further comprising a controller and a button connected to the controller, the controller operable to control supply of power from the power supply in response to actuation of the button, wherein the supply of power by actuation of the button initiates the brake release cycle when the actuation occurs while the apparatus is in the brake applied position.

10. The apparatus of claim 9, further comprising a timer connected to the button and the controller, the timer operative in response to the actuation of the button such that the timer counts while the button is maintained actuated so that when a time counted reaches a predetermined amount, a signal is generated to cause the supply of power to be transmitted from the power supply to the actuation assembly.

11. A method of resetting and braking comprising use of the braking apparatus of claim 1, the braking apparatus initially in a brake applied position wherein a predetermined force is applied from one of the pair of brake shoes onto the other of the pair of brake shoes, the method comprising:

supplying the actuation assembly with power;

engaging the electromagnetic clutch with the ball screw assembly to apply a controlled force onto the cam follower and the at least one of the brake shoes to move the brake shoes from the brake applied position at the start of a brake release cycle toward the brake release position, wherein (i) when power to the actuation assembly is maintained throughout the brake release cycle, the brake release cycle continues to completion such that the brake release position is obtained and (ii) when power to the electromagnetic clutch is removed during performance of the brake release cycle when the brake shoes are in between the brake applied position and the brake release position, the portion of the electromagnetic clutch disengages from the ball screw assembly and the brake shoes return to the brake applied position.

12. The method of claim 11, wherein the predetermined time ranges from 0.1 to 0.2 seconds.

13. The method of claim 11, further comprising:

powering off a motor of the actuation assembly in conjunction with the completion of the brake release cycle while maintaining the supply of power to the electromagnetic clutch of the actuation assembly, the electromagnetic clutch remaining engaged to the ball screw assembly and holding the compressible spring in the compressed state such that the braking apparatus is maintained in the brake release position.

* * * * *